United States Patent
Kii et al.

(10) Patent No.: US 9,420,111 B2
(45) Date of Patent: Aug. 16, 2016

(54) COMMUNICATION DEVICE, METHOD, AND PROGRAM

(71) Applicant: SONY CORPORATION, Tokyo (JP)

(72) Inventors: Manabu Kii, Tokyo (JP); Yasuhide Hosoda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/661,282

(22) Filed: Mar. 18, 2015

(65) Prior Publication Data

US 2015/0281443 A1    Oct. 1, 2015

(30) Foreign Application Priority Data

Mar. 26, 2014 (JP) ................. 2014-063523

(51) Int. Cl.
*H04M 1/64* (2006.01)
*H04M 7/00* (2006.01)

(52) U.S. Cl.
CPC ........ *H04M 7/0036* (2013.01); *H04M 2201/38* (2013.01); *H04M 2201/60* (2013.01); *H04M 2203/1025* (2013.01)

(58) Field of Classification Search
CPC .................................................. H04M 7/0036
See application file for complete search history.

(56) References Cited

U.S. PATENT DOCUMENTS

| | | | | |
|---|---|---|---|---|
| 2003/0179306 A1* | 9/2003 | Lee | ..................... | H04N 5/23293 348/333.07 |
| 2004/0126038 A1* | 7/2004 | Aublant | ............ | G06F 17/30265 382/305 |
| 2007/0165270 A1* | 7/2007 | Kim | ...................... | G06F 3/1205 358/1.15 |
| 2008/0032627 A1* | 2/2008 | Kang | .................. | H04N 1/00236 455/41.2 |
| 2008/0211774 A1* | 9/2008 | Woo | ..................... | G06F 3/03543 345/166 |
| 2011/0059769 A1* | 3/2011 | Brunolli | ................. | G08C 17/02 455/556.1 |
| 2011/0273309 A1* | 11/2011 | Zhang | ............... | H04M 1/72536 340/870.07 |
| 2012/0156996 A1* | 6/2012 | Oba | ......................... | G06F 3/14 455/41.2 |
| 2014/0317005 A1* | 10/2014 | Balwani | ............ | G06Q 10/0832 705/317 |
| 2015/0066797 A1* | 3/2015 | Outwater | ........... | G06Q 10/0833 705/333 |

FOREIGN PATENT DOCUMENTS

| | | | |
|---|---|---|---|
| JP | 2008-271124 A | | 11/2008 |
| JP | 2008271124 | * | 9/2015 |

* cited by examiner

*Primary Examiner* — Joseph T Phan
(74) *Attorney, Agent, or Firm* — Chip Law Group

(57) ABSTRACT

Disclosed is a communication device including a first communication part, a calling processing part, and a second communication part. The first communication part generates a response by a virtual communication party to a user's input and outputs the response from an output unit to realize first communication. The calling processing part controls a communication unit and performs calling processing on a communication device of a real communication party to call the real communication party when the first communication is realized by the first communication part. The second communication part controls the communication unit to supply the user's input accepted by the input unit to the communication device of the real communication party, acquires a response to the user's input from the communication device of the real communication party, and outputs the response to the output unit to realize second communication.

20 Claims, 30 Drawing Sheets

COMMUNICATION DEVICE, METHOD, AND PROGRAM

CROSS REFERENCE TO RELATED APPLICATIONS

This application claims the benefit of Japanese Priority Patent Application JP2014-063523 filed Mar. 26, 2014, the entire contents of which are incorporated herein by reference.

BACKGROUND

The present disclosure relates to communication devices, methods, and programs and, in particular, to a communication device, a method, and a program capable of improving the convenience of communication. In known telephone-call systems using mobile phones, TV-conference systems, or the like, the communication between terminals is allowed when the terminals are connected to each other (see, for example, Japanese Patent Application Laid-open No. 2008-271124). In order to establish the connection, one terminal performs calling processing on another desired terminal, and then the other terminal performs responding processing to the calling processing.

SUMMARY

However, this method is desired to take processing time to perform the calling processing and the responding processing and requests users to be on standby until the connection between the terminals is established and the start of communication such as a call is allowed, which may reduce the convenience of the communication.

The present disclosure has been made in view of the above circumstances, and it is therefore desirable to improve the convenience of communication.

An embodiment of the present technology provides a communication device including a first communication part, a calling processing part, and a second communication part. The first communication part is configured to generate a response by a virtual communication party to a user's input accepted by an input unit and output the generated response from an output unit as one of an image and a voice to realize first communication between a user and the virtual communication party.

The calling processing part is configured to control a communication unit to communicate with another device and perform calling processing on a communication device of a real communication party associated with the virtual communication party to call the real communication party when the first communication is realized by the first communication part. The second communication part is configured to control the communication unit to supply the user's input accepted by the input unit to the communication device of the real communication party having responded to the calling processing of the calling processing part, acquire a response to the user's input from the communication device of the real communication party, and output the acquired response to the output unit to realize second communication between the user and the real communication party.

The calling processing part may start the calling processing with a start of the first communication.

The communication device may further include an evaluation determination part configured to evaluate a content of the first communication and determine whether to perform the calling processing. The calling processing part may start the calling processing when the evaluation determination part determines that the calling processing is performed.

The evaluation determination part may analyze and evaluate a tone of a user's voice accepted by the input unit.

The evaluation determination part may evaluate whether the tone of the voice falls within a range of a tone of a voice of a general conversation and determine that the calling processing is performed when the tone of the voice falls outside the range.

The evaluation determination part may analyze and evaluate a keyword of a user's voice accepted by the input unit.

The evaluation determination part may evaluate whether the user's voice includes a prescribed negative keyword and determine that the calling processing is performed when the user's voice includes the prescribed negative keyword.

The evaluation determination part may analyze and evaluate an image accepted by the input unit.

The evaluation determination part may evaluate whether a user's facial expression falls within a normal range when the image includes a user's face and determine that the calling processing is performed when the user's facial expression falls outside the range.

The evaluation determination part may evaluate, when the image includes a periphery of a user's face, whether an image of the periphery changes and determine that the calling processing is performed when the image of the periphery of the user's face changes.

The evaluation determination part may analyze and evaluate movement of the communication device itself, the movement being accepted by the input unit.

The evaluation determination part may evaluate whether one of vibration and pressure at a prescribed reference level or higher is applied to the communication device and determine that the calling processing is performed when one of the vibration and the pressure at the reference level or higher is applied.

The first communication part may start the first communication with an end of the second communication.

The communication device may further include a first information supply part configured to control the communication unit to supply first information to the communication device of the real communication party associated with the virtual communication party, the first information showing a content of the first communication realized by the first communication part.

The first information may include one of a log of the first communication and a summary of the log.

The first information may include one of a color, a density, a pattern, a graphic, a text, and a symbol, each of which shows a content of the first communication.

The communication device may further include a storage part configured to store setting information of the virtual communication party therein. The first communication part may generate, using the setting information stored in the storage part, the response by the virtual communication part to the user's input accepted by the input unit to realize the first communication.

The communication device may further include a setting information acquisition part configured to acquire the setting information from another device. The storage part may store the setting information acquired by the setting information acquisition part therein.

Another embodiment of the present technology provides a communication method, including: generating a response by a virtual communication party to an accepted user's input and outputting the generated response to realize first communication between a user and the virtual communication party;

performing calling processing on a communication device of a real communication party associated with the virtual communication party to call the real communication party when the first communication is realized; and supplying the accepted user's input to the communication device of the real communication party having responded to the calling processing, acquiring a response to the user's input from the communication device of the real communication party, and outputting the acquired response to realize second communication between the user and the real communication party.

A still another embodiment of the present technology provides a program causing a computer to function as: a first communication part configured to generate a response by a virtual communication party to a user's input accepted by an input unit and output the generated response from an output unit as one of an image and a voice to realize first communication between a user and the virtual communication party; a calling processing part configured to control a communication unit to communicate with another device and perform calling processing on a communication device of a real communication party associated with the virtual communication party to call the real communication party when the first communication is realized by the first communication part; and a second communication part configured to control the communication unit to supply the user's input accepted by the input unit to the communication device of the real communication party having responded to the calling processing of the calling processing part, acquire a response to the user's input from the communication device of the real communication party, and output the acquired response to the output unit to realize second communication between the user and the real communication party.

According to an embodiment of the present technology, a response by a virtual communication party to an accepted user's input is generated and output to realize first communication between a user and the virtual communication party. In addition, calling processing is performed on a communication device of a real communication party associated with the virtual communication party to call the real communication party when the first communication is realized. Moreover, the accepted user's input is supplied to the communication device of the real communication party having responded to the calling processing, a response to the user's input is acquired from the communication device of the real communication party, and the acquired response is output to realize second communication between the user and the real communication party.

According to the present disclosure, it is possible to perform communication with communication parties. In particular, it is possible to improve the convenience of the communication.

These and other objects, features and advantages of the present disclosure will become more apparent in light of the following detailed description of best mode embodiments thereof, as illustrated in the accompanying drawings.

DETAILED DESCRIPTION OF EMBODIMENTS

Next, modes (hereinafter referred to as embodiments) for carrying out the present disclosure will be described. Note that the description will be given in the following order.

1. First Embodiment (Communication Device)
2. Second Embodiment (Virtual Communication)
3. Third Embodiment (Switching of Communication)

1. First Embodiment
(Communication Device)

Figure 1A:
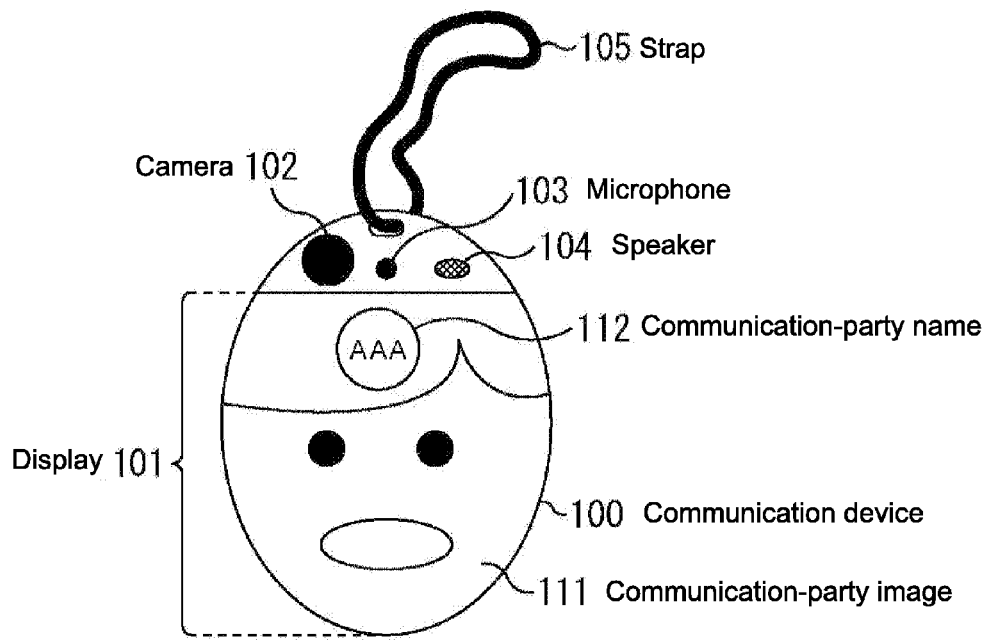
FIGS. 1A, 1B, and 1C are views showing a main configuration example of the housing of a communication device.
Figure 1B:
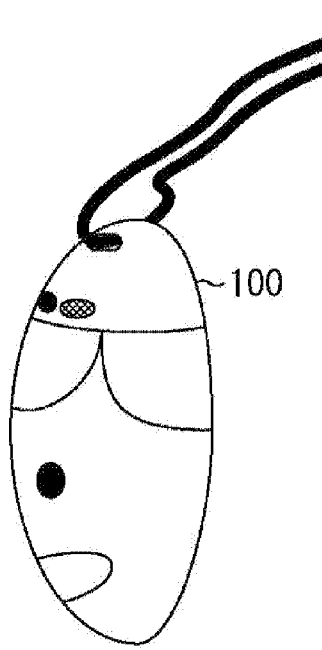
Figure 1C:

FIGS. 1A to 1C are external views showing a main configuration example of the housing of a communication device to which the present technology is applied.

The communication device 100 shown in FIGS. 1A to 1C is a device that performs communication such as a dialogue with users. For example, the communication device 100 has a prescribed communication function and is thus allowed to communicate with another communication device. With the use of the communication function, the communication device 100 is allowed to realize the communication (for example, the telephone call) between a user and a communication party (user of another communication device).

FIG. 1A is a view as seen from the front surface of the communication device 100. As shown in FIG. 1A, the communication device 100 has input/output devices such as a display 101, a camera 102, a microphone 103, and a speaker 104 at the front surface thereof.

The display 101 includes, for example, a LCD (Liquid Crystal Display), an organic EL (Electro Luminescence) display, or the like. The display 101 has, for example, an image of a communication party (communication-party image 111), the user name of the communication party (communication-party name), or the like displayed thereon. The communication-party image 111 may be, for example, an image registered in the communication device 100 in advance or may be an image taken and transmitted by another communication device. In addition, a touch panel may be provided so as to be superimposed on the display 101. In this case, the display may have an operating GUI (Graphical User Interface) or the like displayed thereon and accept a user's operation on the GUI through the touch panel.

The camera 102 takes an image on the front side of the communication device 100. The data of the taken image is transmitted to another communication device through, for example, the communication function of the communication device 100. Note that the taken image may be a moving image, a still image, or an image including both the images.

The microphone 103 mainly collects a voice from the front side of the communication device 100. The data of the collected voice is transmitted to another communication device through, for example, the communication function of the communication device 100.

The speaker 104 outputs a voice. For example, the speaker 104 outputs voice data, which is acquired from another communication device through the communication function of the communication device 100, as a voice.

With the use of these input/output devices of the communication device 100, the user is allowed to perform communication with, for example, a communication party through an image, a voice, or the like.

The communication device 100 may have any size. In the example of FIGS. 1A to 1C, the user has the communication device 100 hang around his/her neck to be used as will be described later. Accordingly, in this case, the communication device 100 has, for example, a size enough to be put on the palm of the user or a size slightly larger than the palm of the user (i.e., a size at which the user does not feel uncomfortable when hanging the communication device 100 around his/her neck and does not feel a heavy weight).

In addition, the communication device 100 may have any shape. For example, the communication device 100 is formed in a shape as shown in FIGS. 1A to 1C. As shown in, for example, FIG. 1A, the communication device 100 is formed in an oval shape as seen from the front surface thereof.

FIG. 1B is a view as seen from the side surface of the communication device 100 (from the right side of the communication device 100 in FIG. 1A). That is, in FIG. 1B, the front surface of the communication device 100 is directed leftward. In this example, as shown in FIG. 1B, the front surface of the communication device 100 is curved in a vertical direction. Note that although the back surface of the communication device 100 opposing the front surface (the right-side surface of the communication device 100 in FIG. 1B) is also curved, the curvature of the back surface is smaller than that of the front surface.

FIG. 1C is a view as seen from the lower surface of the communication device 100 (from the lower side of the communication device 100 in FIG. 1A). That is, in FIG. 1C, the front surface of the communication device 100 is directed upward. In this example, as shown in FIG. 1C, the front surface of the communication device 100 is curved in a horizontal direction. Note that although the back surface of the communication device 100 opposing the front surface (the lower-side surface of the communication device 100 in FIG. 1C) is also curved, the curvature of the back surface is smaller than that of the front surface.

Since the front surface of the communication device 100 is curved and the display 101 is provided on the front surface (i.e., the display 101 is provided to be curved), the display 101 may have a communication-party image 111 (a face image of a communication party) three-dimensionally displayed thereon. Thus, the eyes of a communication-party image may be three-dimensionally expressed. For example, even if the eyes of a communication-party image are horizontally turned from the center of the front surface, a person in an adequate position is allowed to catch the eyes. Note that even if the display 101 is provided inside the housing in its flat form and a transparent housing is superimposed on the display 101 so as to form a curved front surface, it is possible to make an image seen slightly three-dimensionally on the display 101 with the lens effect of the housing.

Note that the housing of the communication device 100 may have any shape as described above, and thus the front surface, the back surface, or the like may be formed in a flat shape. In addition, the front surface may not be formed in an oval shape as shown in FIG. 1A. The front surface may be formed in, for example, a rectangle shape such as a square, a circular shape, or the like.

As shown in FIG. 1A, a strap 105 may be attached to the upper part of the communication device 100. As described above, the user may have the communication device 100 hang around his/her neck to be used.

(Use Case 1)

Next, a description will be given of a use example of the communication device 100. As described above, the user may have the communication device 100 hang around his/her neck to be used. In this case, the front surface of the communication device 100 does not oppose the user but is directed in the same direction as the user as shown in, for example, FIG. 2.

Figure 2:
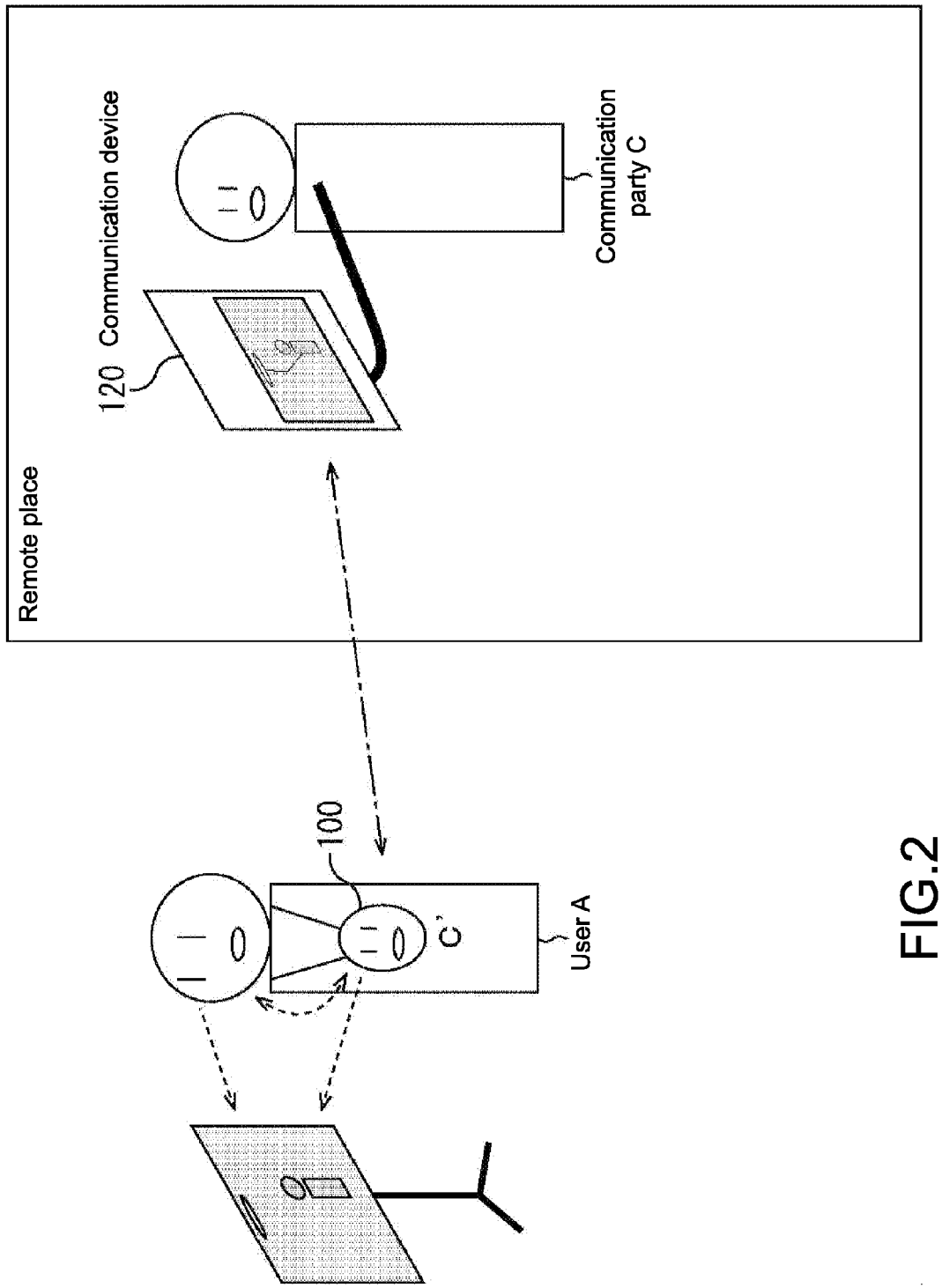
FIG. 2 is a view describing a use example.

In the example of FIG. 2, the user of the communication device 100, i.e., a user A performs communication with a communication party C existing in a remote place. The communication device 100 communicates with a communication device 120 operated by the communication party C and sends/receives an image and a voice to/from the communication device 120 to realize the communication.

On this occasion, the display 101 at the front surface of the communication device 100 has a face image C' of the communication party C displayed thereon. Meanwhile, the camera 102 is provided at the front surface of the communication device 100. Therefore, the communication device 120 has an image obtained by almost the same eyes of the user A rather than a face image of the user A displayed thereon.

As described above, the communication device 100 has the input devices such as the camera 102 and the microphone 103 at the front surface of the housing and is used with the front surface directed in the same direction as the eyes of the user A. Therefore, the communication party C is allowed to see the same direction (for example, the same scene, item, or the like)

or is allowed to hear the same voice. That is, the user A is allowed to share an experience with the communication party C existing in the remote place and perform communication such as a dialog on the experience.

(Use Case 2)

As described above, the communication device 100 has the display 101 and the speaker 104 at the front surface of the housing. Accordingly, as shown in, for example, FIG. 3, the communication device 100 is allowed to cause the communication party C existing in the remote place to join the conversation between the user A and a dialog party B existing in the same place.

Figure 3:
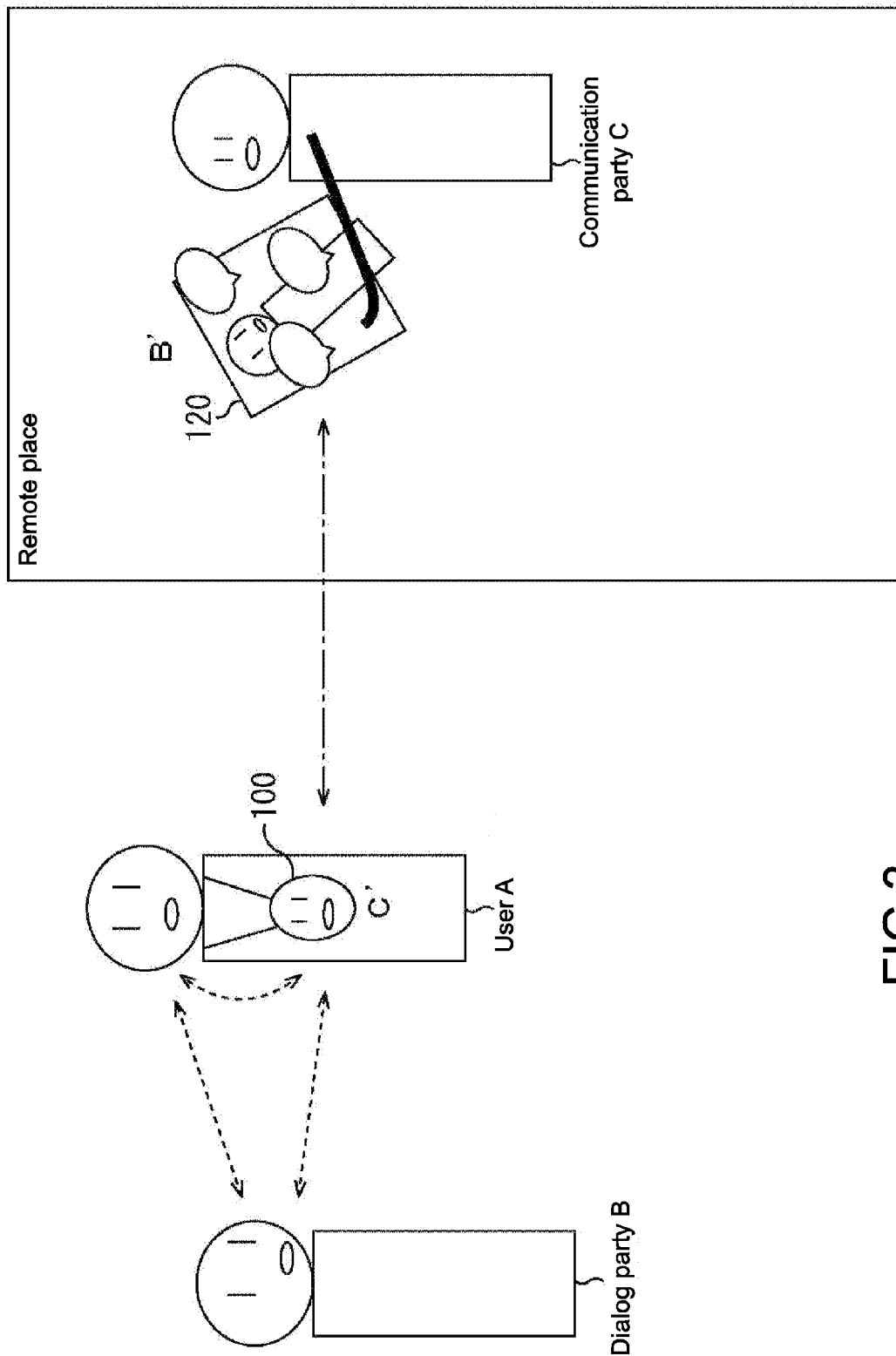
FIG. 3 is a view describing another use example.

In the example of FIG. 3, the display 101 of the communication device 100 has the face image C' of the communication party C displayed thereon. In addition, the communication device 120 has a face image B' of the dialog party B displayed thereon. Accordingly, the dialog party B and the communication party C are allowed to perform communication such as a dialog with each other. Of course, in the example of FIG. 3, the user A and the communication party C are allowed to perform communication such as a dialog with each other as in the example of FIG. 2. That is, the communication device 100 is allowed to realize the communication between the three persons, i.e., the user A, the dialog party B, and the communication party C.

On this occasion, the user A has the communication device 100 hang around his/her neck to be used. Therefore, besides realizing the communication between the three persons, i.e., the user A, the dialog party B, and the communication party C, the communication device 100 is allowed to cause the communication party C to join the communication between the user A and the dialog party B as being in a position close to the user A (friends with the user A). Thus, the communication device 100 is allowed to provide the participant of communication with directivity.

(Use Case 3)

Of course, the communication device 100 may be used in any state (position) other than the above state. As shown in, for example, FIG. 4, the communication device 100 may be used with the front surface thereof facing the user A.

Figure 4:
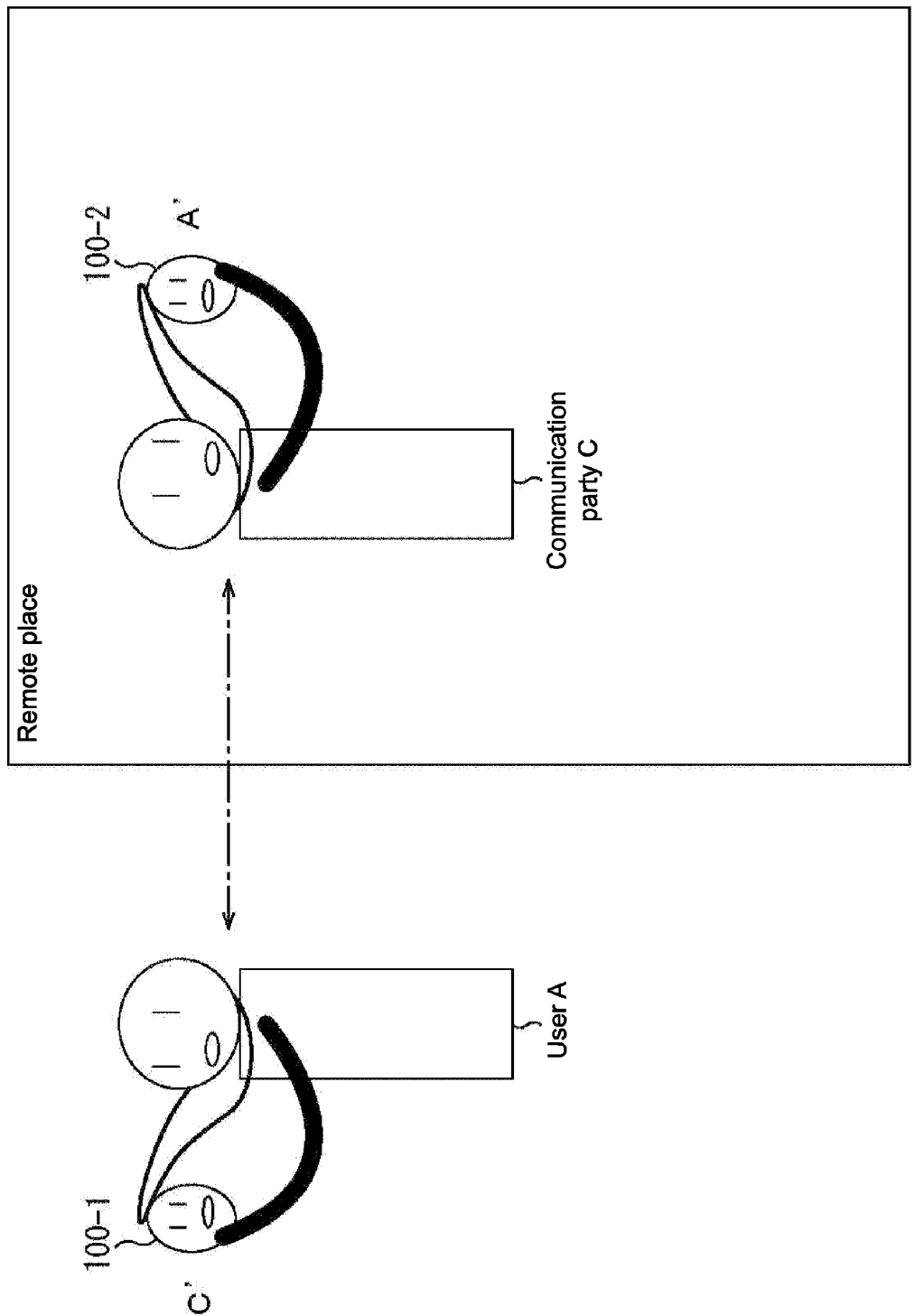
FIG. 4 is a view describing still another use example.

In addition, the communication device 100 is allowed to communicate with any communication device. That is, as shown in the example of FIG. 4, the communication devices 100 is allowed to communicate with each other. In the example of FIG. 4, the user A operates a communication device 100-1, while the communication party C operates a communication device 100-2. When the communication device 100-1 and the communication device 100-2 communicate with each other, communication such as a dialog is realized between the user A and the communication party C.

In the example of FIG. 4, the user A uses the communication device 100-1 with the front surface thereof directed to the user A himself/herself, while the communication party C uses the communication device 100-2 with the front surface thereof directed to the communication party C himself/herself. Therefore, the display 101 of the communication device 100-1 has the face image C' of the communication party C displayed thereon, while the display 101 of the communication device 100-2 has the face image A' of the user A displayed thereon. That is, in the example of FIG. 4, the user A and the communication party C are allowed to perform communication such as a dialog with each other while seeing their face images.

(Communication)

As described above, the communication device 100 communicates with another communication device. The communication device 100 may have any communication method.

Figure 5A:
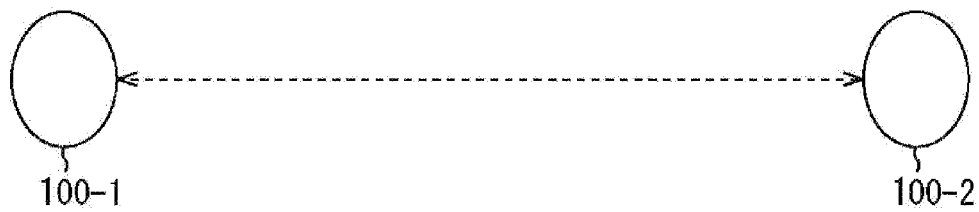
FIGS. 5A, 5B, and 5C are views describing connection examples.

As shown in, for example, FIG. 5A, the communication device 100-1 and the communication device 100-2 may directly communicate with each other based on wireless communication. This wireless communication may be, for example, the ad hoc mode of an IEEE (Institute of Electrical and Electronic Engineers) 802.11 wireless LAN (Local Area Network), optical communication using infrared rays as standardized by IrDA (Infrared Data Association), a method based on a prescribed standard such as Bluetooth™, or a unique wireless communication method.

Note that the communication device 100 desirably performs wireless communication since the user carries the communication device 100 with him/her to be used. However, the communication device 100 may, of course, perform wired communication. That is, in the example of FIG. 5A, the communication device 100-1 and the communication device 100-2 may directly communicate with each other based on wired communication. On this occasion, the communication device 100-1 and the communication device 100-2 may be connected to each other via, for example, the cable of a prescribed standard such as USB (Universal Serial Bus) and IEEE1394 and perform communication based on the standard, or may be connected to each other via a unique cable and perform communication based on a unique standard.

Figure 5B:
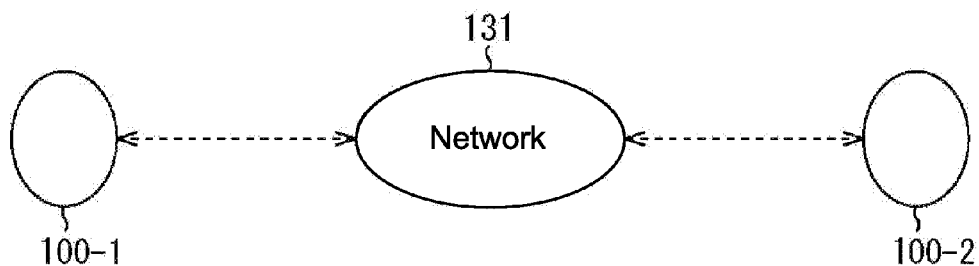

In addition, as shown in FIG. 5B, the communication device 100-1 and the communication device 100-2 may communicate with each other via a prescribed network 131. The network 131 may be any communication network. As such, a wired communication network, a wireless communication network, or a network including both the networks may be used. Examples of the network 131 may include a wired LAN, a wireless LAN, a public telephone network, a wide-range communication network for wireless mobile objects such as so-called a 3G network and a 4G network, and the Internet. In addition, the network 131 may include one communication network or a plurality of communication networks.

The communication device 100 is connected to the network 131 via wireless communication. The communication device 100 may be connected to the network 131 via, for example, the access point of an IEEE802.11 wireless LAN. In addition, the communication device 100 may be connected to the network 131 via, for example, the base station of wireless mobile object communication.

Of course, the communication device 100 may be connected to the network 131 via wired communication. The communication device 100 may be connected to the network 131 via, for example, a HUB or a router using a LAN cable (Ethernet™ cable) or the like.

The communication device 100 may be connected to the network 131 based on a plurality of communication methods. In addition, the communication device 100 may be connected to the network 131 based on any one of a plurality of communication methods prepared in advance. On this occasion, in the example of FIG. 5B, a communication method based on which the communication device 100-1 is connected to the network 131 and a communication method based on which the communication device 100-2 is connected to the network 131 may be the same or different from each other.

Figure 5C:
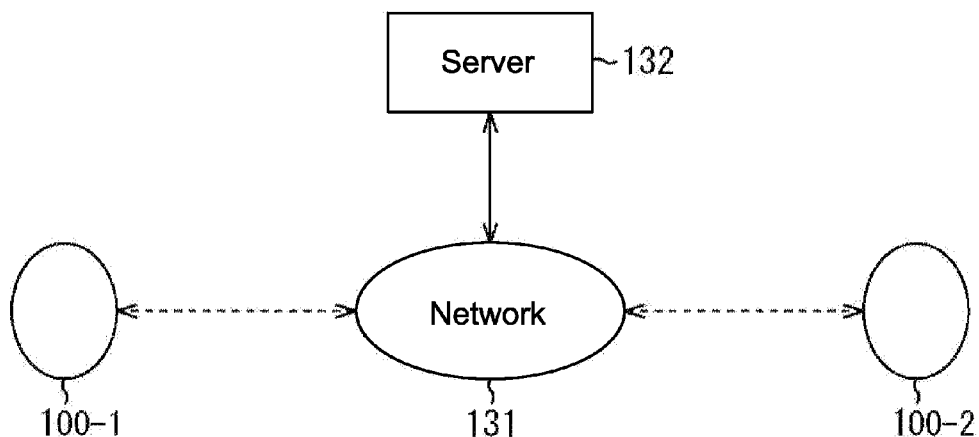

Moreover, as shown in FIG. 5C, the communication device 100-1 and the communication device 100-2 may communicate with each other via a prescribed server 132. For example, data may be sent/received via the server 132 after the connection between the communication device 100-1 and the communication device 100-2 is established, or communication for establishing the connection between the communication device 100-1 and the communication device 100-2 may be performed via the server 132.

The server 132 may offer any service. For example, the server 132 may manage each terminal such as the communication device 100 and the information of the user of the terminal. In addition, the server 132 may offer software (program or data) to be installed in the communication device 100. Moreover, the server 132 may manage the communication log between terminals.

(Inside Configuration)

Figure 6:
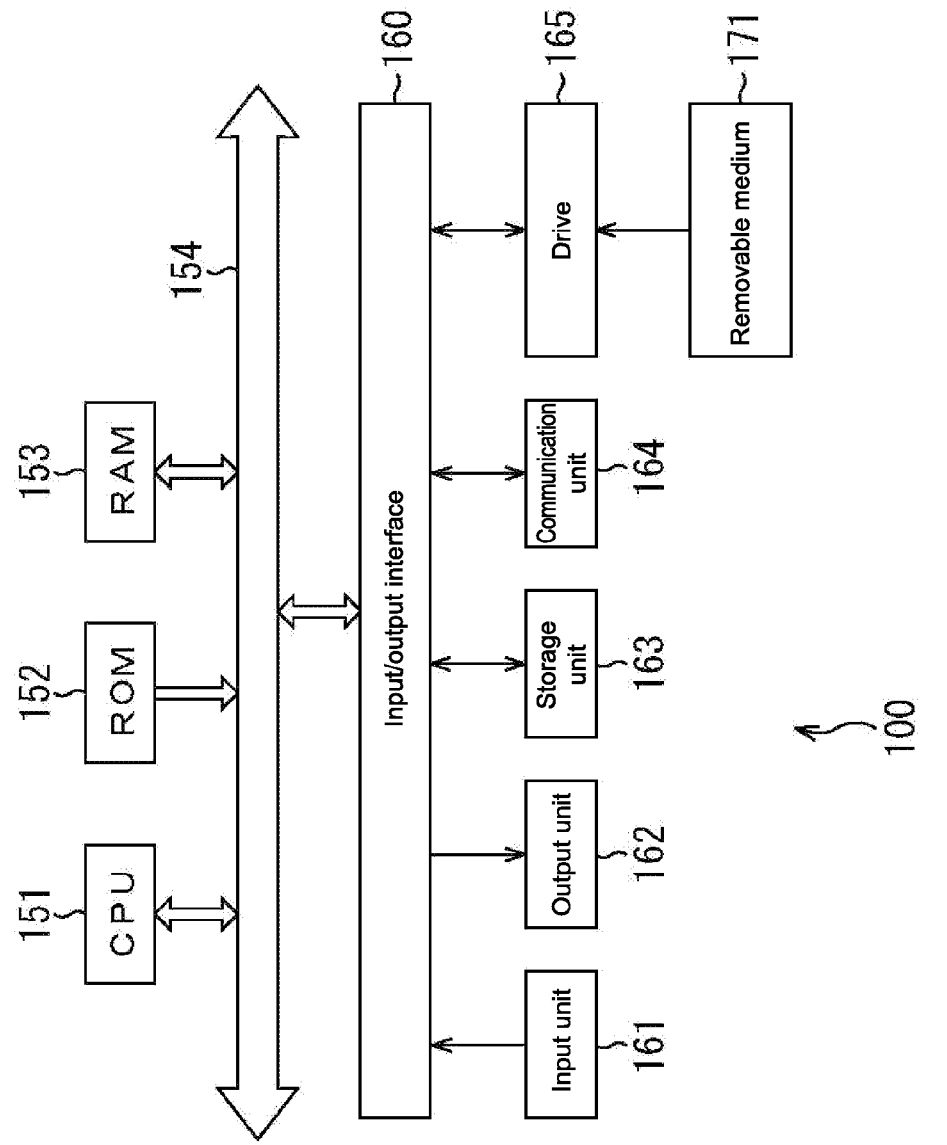
FIG. 6 is a block diagram showing a main configuration example of the communication device.

FIG. 6 is a block diagram showing a main configuration example of the inside of the communication device 100.

As shown in FIG. 6, a CPU (Central Processing Unit) 151, a ROM (Read Only Memory) 152, and a RAM (Random Access Memory) 153 are connected to each other via a bus 154 in the communication device 100.

The bus 154 is also connected to an input/output interface 160. The input/output interface 160 is connected to an input unit 161, an output unit 162, a storage unit 163, a communication unit 164, and a drive 165.

The input unit 161 includes input devices that accept outside information through a user's input or the like. Examples of the input unit 161 include the camera 102, the microphone 103, an operation button, a touch panel, and an input terminal. In addition, the examples of the input unit 161 may include various sensors such as an acceleration sensor, an optical sensor, and a temperature sensor.

The output unit 162 includes output devices that output information such as an image and a voice. Examples of the output unit 162 include the display 101, the speaker 104, and an output terminal.

The storage unit 163 includes, for example, a hard disk, a RAM disk, a non-volatile memory, or the like. The communication unit 164 includes, for example, a network interface. The drive 165 drives, for example, a removable medium 171 such as a magnetic disk, an optical disk, a magnetic optical disk, and a semiconductor memory.

For example, the CPU 151 loads a program stored in the storage unit 163 into the RAM 153 via the input/output interface 160 and the bus 154 and executes the same to perform various processing. Data or the like used by the CPU 151 to perform various processing is stored in the RAM 153 as occasion demands.

For example, a program executed by the CPU 151 may be recorded on the removable medium 171 serving as a package medium or the like and supplied to the communication device 100. On this occasion, the program may be installed in the storage unit 163 via the input/output interface 160 when the removable medium 171 is attached to the drive 165.

In addition, the program may be supplied to the communication device 100 via a wired or wireless transmission medium such as a LAN, the Internet, and digital satellite broadcasting. On this occasion, the program may be received by the communication unit 164 via a wired or wireless transmission medium and installed in the storage unit 163.

Besides, the program may be installed in the ROM 152 or the storage unit 163 in advance.

Note that the program executed by the CPU 151 may be a program chronologically processed in the order described in the specification or may be a program processed in parallel or at appropriate timing such as when being invoked.

(Input/Output Devices)

The communication device 100 has the one microphone 103 and the one speaker 104 in FIGS. 1A to 1C but may have a plurality of microphones 103 and speakers 104.

Figure 7A:
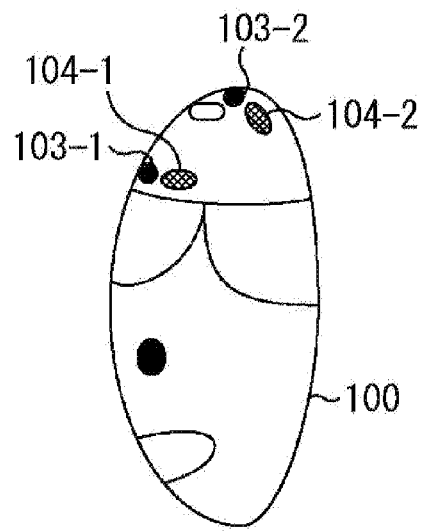
FIGS. 7A, 7B, and 7C are views showing another configuration example of the housing of the communication device.

In the example of FIG. 7A, the communication device 100 has a microphone 103-1, a speaker 104-1, a microphone 103-2, and a speaker 104-2. The microphone 103-1 and the speaker 104-1 are provided so as to be directed to the front side of the communication device 100. That is, the microphone 103 mainly collects a voice from the front side of the communication device 100, while the speaker 104-1 outputs a voice to the front side thereof. In other words, in the use example of FIG. 3, the microphone 103-1 and the speaker 104-1 are provided mainly to establish the communication between the dialog party B and the communication party C. That is, the microphone 103-1 mainly collects a voice from the dialog party B, while the speaker 104-1 mainly outputs the voice of the communication party C to the dialog party B.

In addition, the microphone 103-2 and the speaker 104-2 are provided so as to be directed to the upper front side of the communication device 100. That is, the microphone 103-2 mainly collects a voice from the upper front side of the communication device 100, while the speaker 104-2 outputs a voice to the upper front side thereof. That is, in the use example of FIG. 3, the microphone 103-2 and the speaker 104-2 are provided mainly to establish the communication between the user A and the communication party C. That is, the microphone 103-2 mainly collects a voice from the user A, while the speaker 104-2 mainly outputs the voice of the communication party C to the user A.

In this case, the microphone 103-1 and the microphone 103-2 are included in the input unit 161 (FIG. 6). In addition, the speaker 104-1 and the speaker 104-2 are included in the output unit 162 (FIG. 6).

Thus, with the separation of the input/output devices for the user A from the input/output devices for the dialog party B, the communication device 100 allows selection as to whom the communication party C communicates with. For example, by stopping the input of the microphone 103-1 and the output of the speaker 104-1, the communication device 100 is allowed to realize the communication between the user A and the communication party C in a state in which the communication between the dialog party B and the communication party C is stopped. Thus, for example, the communication party C is allowed to whisper to the user A so as not to be heard by the dialog party B. While, by whispering to the communication party C so as not to be heard by the dialog party B, the user A is also allowed to communicate only with the communication party C.

Figure 7B:
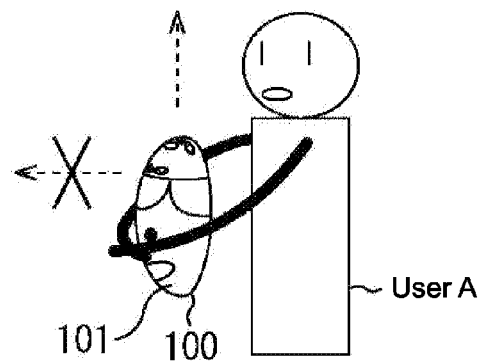

Note that it may be possible to use any method for controlling such input/output destinations with the communication device 100. For example, the user A may control the destinations. In this case, as shown in, for example, FIG. 7B, the microphone 103-1 and the speaker 104-1 may be turned off when the user A covers the communication party image 111 (face image C') (for example, the eyes, the mouth, or the like) displayed on the display 101 with his/her hands and the touch panel superimposed on the display 101 detects the operation. On this occasion, only the communication between the user A and the communication party C is realized since the microphone 103-2 and the speaker 104-2 remain turned on. When the user A moves his/her hands off the display 101, the microphone 103-1 and the speaker 104-1 are turned on again to realize the communication between the dialog party B and the communication party C.

Figure 7C:
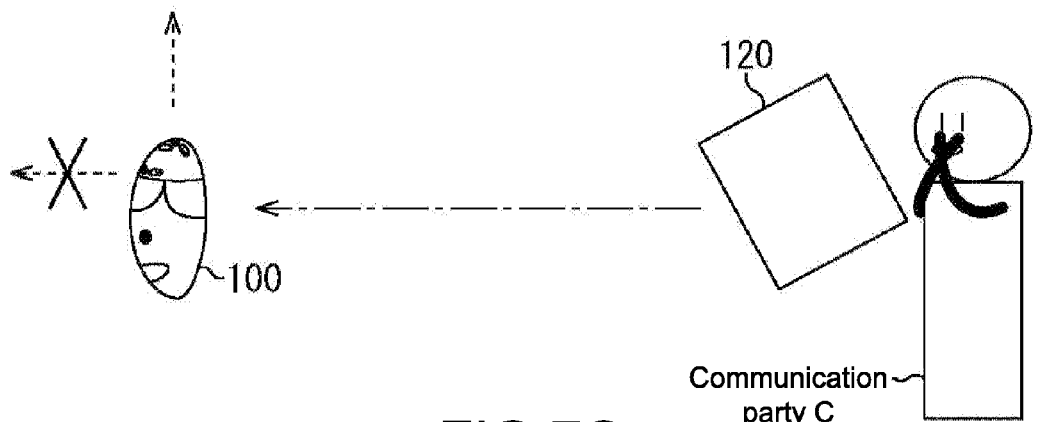

In addition, for example, the user C may perform such control in the remote place. On this occasion, when the communication party C covers a mouth with his/her hands as shown in, for example, FIG. 7C, the camera of the communication device 120 transmits an image showing the state to the communication device 100. When determining from the image that the communication party C covers the mouth with his/her hands, the communication device 100 turns off the microphone 103-1 and the speaker 104-1. On this occasion, only the communication between the user A and the communication party C is realized as described above since the microphone 103-2 and the speaker 104-2 remain turned on. When the communication party C moves his/her hands off the mouth, the communication device 100 detects the fact from an image transmitted from the communication device 120 and turns on the microphone 103-1 and the speaker 104-1 again. Thus, the communication between the dialog party B and the communication party C is also realized.

With the control described above, the communication device 100 is allowed to realize communication in various ways and improve the convenience of the communication.

(Display)

The display 101 of the communication device 100 may have any image displayed thereon. Therefore, any image other than the communication-party image 111 and the communication-party name 112 described above may be displayed on the display 101.

For example, the display 101 may have a stamp image including a prescribed graphic, symbol, text, or the like displayed thereon according to the contents of communication, user's instructions, or the like. In addition, the display contents may be made different from each other between both terminals that perform communication.

Figure 8A:
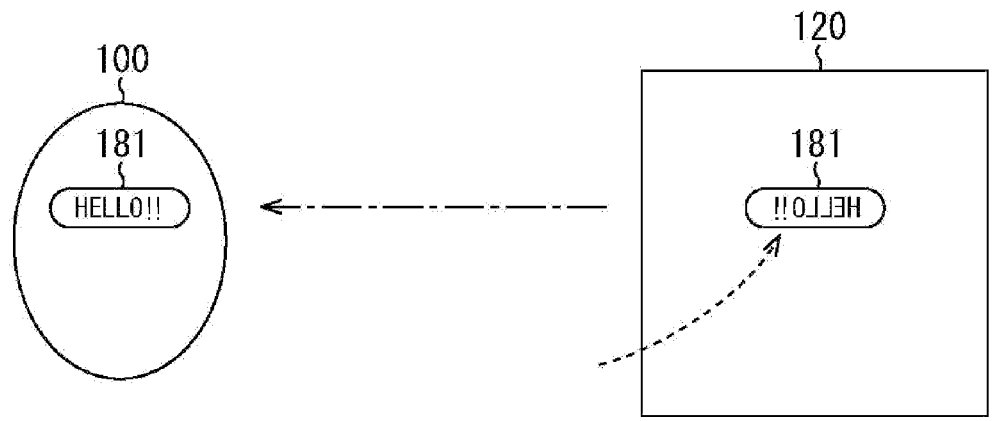
FIGS. 8A and 8B are views showing display examples.

As shown in, for example, FIG. 8A, when the communication party C operates the communication device 120 to have a stamp image 181 displayed on the display of the communication device 100, the stamp image 181 is transmitted to the communication device 100 and displayed on the display 101 of the communication device 100. On this occasion, the back side of the stamp image 181 may be displayed on the display of the communication device 120, while the front side of the stamp image 181 may be displayed on the display 101 of the communication device 100.

Figure 8B:
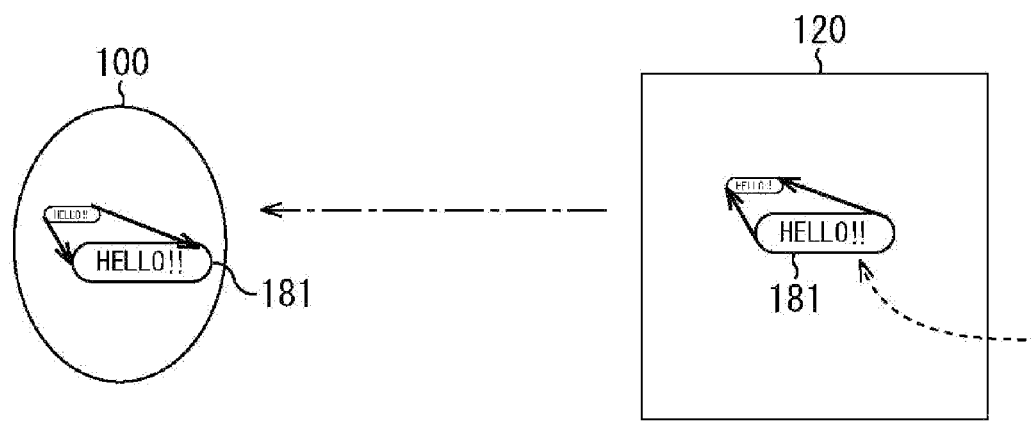

In addition, the stamp image 181 may be a moving image. As shown in, for example, FIG. 8B, the stamp image 181 may be displayed so as to become gradually smaller on the display of the communication device 120 (so as to show a state in which the stamp image 181 is being transmitted from the communication device 120 to the communication device 100) when the communication party C operates the communication device 120 to have the stamp image 181 displayed on the display of the communication device 120.

Moreover, the stamp image 181 is transmitted to the communication device 100. Then, as shown in, for example, FIG. 8B, the stamp image 181 may be displayed so as to become gradually larger on the display 101 of the communication device 100 (so as to show a state in which the stamp image 181 is being transmitted from the communication device 120 to the communication device 100).

On this occasion, as in the case of FIG. 8A, the back side of the stamp image 181 may be displayed on the display of the communication device 120.

With such a display, the communication device 100 is allowed to express the state of communication more clearly and improve the entertaining feeling and the convenience of the communication.

(Actuator)

The communication device 100 may have an actuator as an output device. For example, the communication device 100 may have a vibrator to vibrate the housing or may have a movable unit as shown in FIG. 9.

Figure 9:
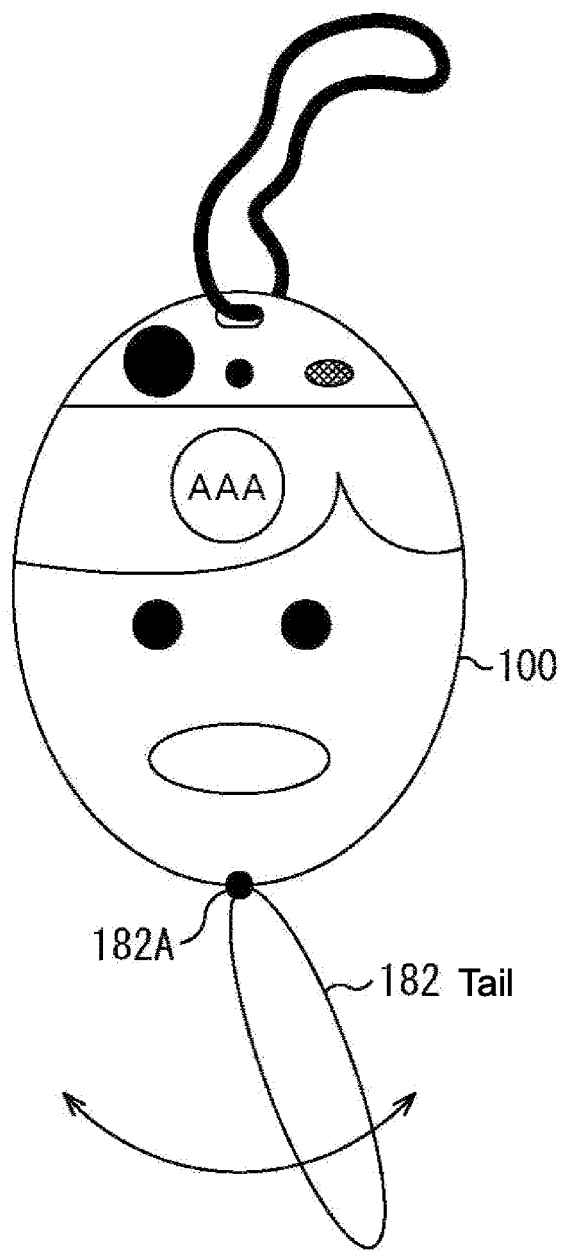
FIG. 9 is a view showing still another configuration example of the housing of the communication device.

In the example of FIG. 9, the communication device 100 has a tail 182 as a movable unit. An actuator (not shown) included in the communication device 100 horizontally drives the tail 182 about a point 182A as indicated by both arrows.

In this case, the actuator and the tail 182 are included in the output unit 162 (FIG. 6).

The communication device 100 may express, for example, the emotion or the like of the communication party C by moving the tail 182. For example, the communication device 100 may analyze a voice or an image of the communication party C to guess the emotion of the communication party C and move the tail 182 in harmony with the emotion. In addition, for example, with a remote operation via communication by the communication party C to instruct the movement of the tail 182, the communication device 100 may move the tail 182.

Note that such an emotion may be expressed by any method other than the tail 182. For example, the actuator may move the housing of the communication device 100 (may perform the movement, the rotation, or the like of the housing in, for example, all directions), or a vibrator may vibrate the housing. In addition, a luminescence device such as a LED (Light Emitting Diode) may be caused to emit light. Moreover, a stamp image, a background image, or the like may be displayed on the display 101.

As described above, since the communication device 100 may express information (emotions or the like) other than images or voices on dialogs, it is allowed to realize communication in further various ways and improve the convenience of the communication.

2. Second Embodiment (Virtual Communication)

Figure 10:
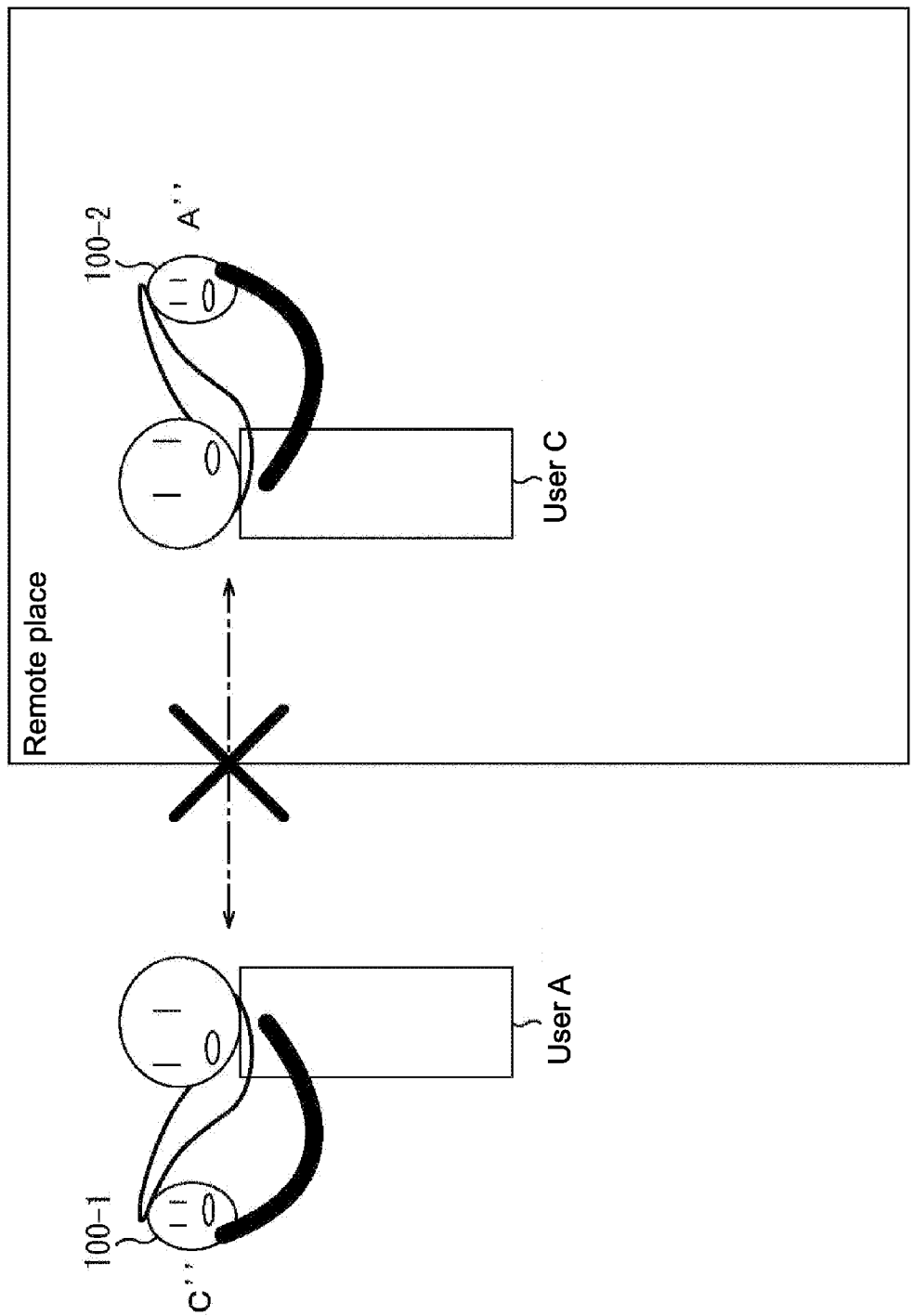
FIG. 10 is a view describing a use example.

The communication device 100 is allowed to realize virtual communication even in a state in which the communication device 100 is not connected to the communication device of a communication party as shown in FIG. 10.

The communication device 100 is allowed to have virtual communication parties, which are called personals, registered therein. As shown in, for example, FIG. 10, when a personal C", i.e., a virtual communication party C is registered in a communication device 100-1 in a state in which the connection between the communication device 100-1 and a communication device 100-2 is not established, a user A is allowed to communicate with the personal C". Similarly, when a personal A", i.e., a virtual user A is registered in the communication device 100-2, the communication party C is allowed to communicate with the personal A".

The communication described above represents virtual communication in which communication with a real communication party is not performed. Next, such virtual communication (also called first communication) will be described.

A description will be given, with reference to FIGS. 11A and 11B, of an example of the state of the virtual communication (first communication).

First, the user A performs an operation to input any information on the communication device 100. As shown in, for example, FIG. 11A, it is assumed that the user A speaks to the communication device 100 to ask for "what we will do today." Note that the operation to input information may be performed in any way so long as the information could be accepted by the communication device 100. For example, any information input operation other than a voice such as a gesture operation, a touch operation, and a button operation may be used. Specifically, the communication device 100 may accept the information with the microphone 103 or the like when the operation is performed through a voice, accept the information with the camera 102 or the like when the operation is performed through a gesture, accept the information with a touch panel or the like when the operation is performed through a touch, or accept the information with an input button or the like when the operation is performed through a button.

Upon accepting a user's input, the communication device 100 analyzes the user's input and determines whether to start the virtual communication (or whether to instruct the start of the virtual communication). For example, upon accepting the input of a voice as described above with the microphone 103, the communication device 100 analyzes the data of the voice and determines whether the user is speaking to the communication device 100. When determining that the user is speaking to the communication device 100 (or the user is instructing the start of the communication), the communication device 100 activates personals that have been suspended and registered in advance and brings the same into operation. The communication device 100 generates responses by the operating personals to the user's input and outputs the same. As shown in, for example, FIG. 11A, the communication device 100 has avatar images of the personals displayed on the display 101 so as to respond to the speaking of the user A and outputs voices from the speaker 104 as responses.

Figure 11A:
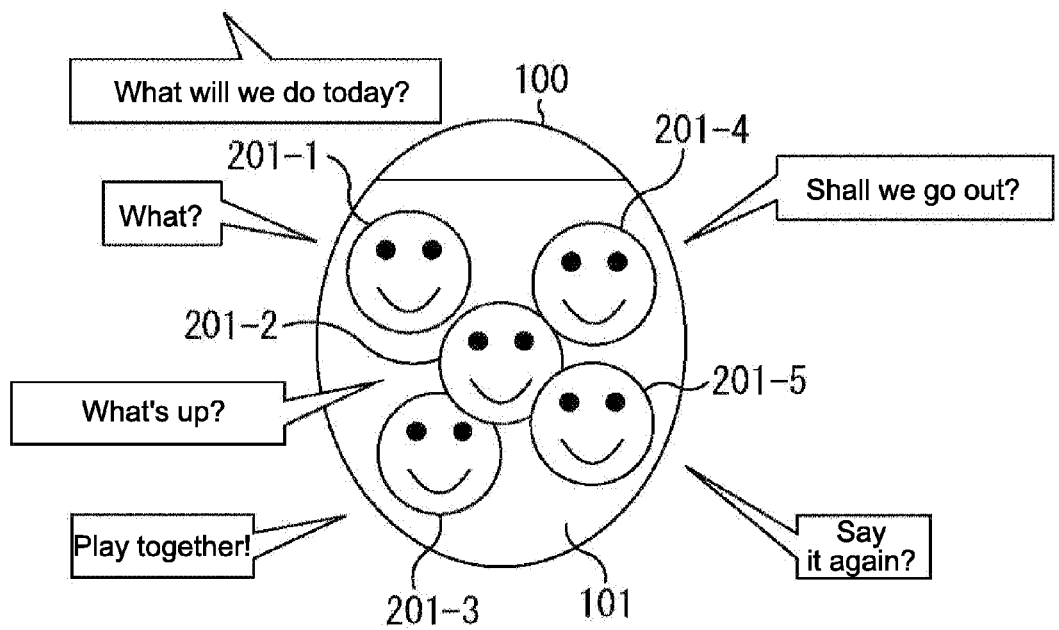
FIGS. 11A and 11B are views describing display examples.

As shown in FIG. 11A, the communication device 100 may have the plurality of personals registered therein and generates responses by the respective personals to the user's input.

In the example of FIG. 11A, when the user A speaks to the communication device 100 to ask for "what we will do today," the communication device 100 has avatar images 201-1 to 201-5 displayed on the display 101 and outputs responses (voices) such as "What?," "What's up?," "Play together!," "Shall we go out?," and "Say it again?" by the personals of the respective avatar images from the speaker 104.

Figure 11B:
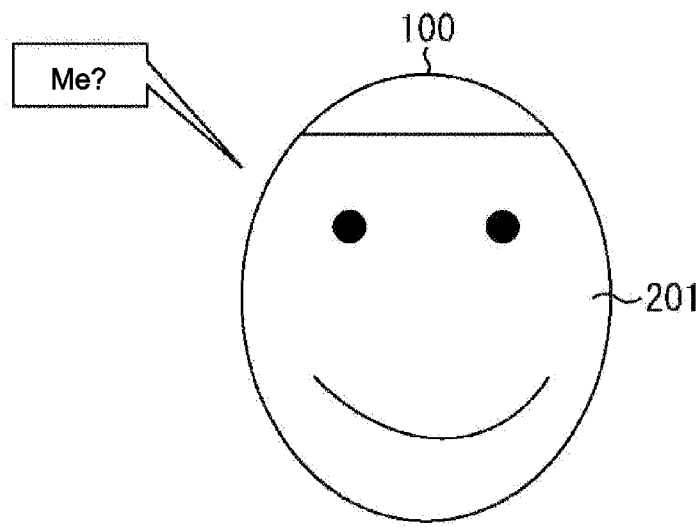

Then, for example, when the user A selects desired one of the avatar images 201-1 to 201-5 displayed on the display 101, the selected avatar image 201 is displayed on the entire display 101 as shown in FIG. 11B and the personal of the avatar image is selected as the communication party of the user A. That is, only the personal maintains its operation state, while the remaining personals stop their operations.

In the example of FIG. 11B, the communication device 100 generates a response (voice) "Me?" by the personal of the selected avatar image 201 and outputs the same from the speaker 104.

When the user A performs an input on the communication device 100 through speaking, a gesture operation, a touch operation, or the like, the communication device 100 generates a response by the selected personal to the user's input and outputs the same.

The personal is associated with, for example, the real user of another communication device 100 and makes a response instead of the user when the communication device 100 is not connected. That is, the personal represents information that realizes the virtual communication party of the user of the communication device 100 and includes, for example, setting information (hereinafter also called a profile) showing the personalities (characteristics) of the virtual communication party and information (for example, an avatar image, voice sampling data, or the like) of the virtual communication party.

The profile represents information that characterizes a response by the personal. The response by the personal may be characterized in any way. For example, the profile may specifically designate a response to a user's input by a "cookie-cutter approach," may abstractly designate a personality (characteristic) such as "funny," "irritable," and "mawkish," or may limit a response topic range or a response direction in such a way as to "respond to all inputs," "respond to troubles or consultations," "make a greeting-response," "ignore," or "attack."

The profile may be either setting data or a program. In any case, when the profile is executed by the CPU 151, the personal is brought into operation and allowed to make a response. The CPU 151 generates a response by the personal to a user's input. That is, the personal replies a response to a user's input like artificial intelligence.

Thus, the communication device 100 is allowed to realize the virtual communication between the user A and the personal.

Accordingly, the communication device 100 is allowed to realize not only the communication (hereinafter also called the live communication or the second communication) between the user A and the communication party C but the virtual communication described above. That is, the communication device 100 is allowed to realize communication in further various ways and improve the convenience of the communication.

Note that the virtual communication described above may be realized by any device. That is, the virtual communication does not depend on a device. For example, the virtual communication described above may be realized by any communication device other than the communication device 100. However, in the following description, the communication device 100 is exemplified as a device that realizes the virtual communication.

In addition, information (hereinafter also called virtual information or first information) showing the contents of the virtual communication described above may be supplied to the supply source of the personal. The virtual information may be in any form so long as it shows the contents of the virtual communication. For example, the virtual information (first information) may include a log of the virtual communication (a voice or a text generated from the voice), the summary of the log, or an item abstractly showing the contents of the log by, for example, a color, a density, a pattern, a graphic, a text, symbols, or the like.

In addition, the virtual information may be supplied to any other devices besides the supply source of the personal. For example, the virtual information may be supplied to a server that manages the virtual information.

Moreover, the virtual information may be supplied at any timing. For example, the virtual information may be appropriately supplied during the virtual communication or may be supplied after the virtual communication.

The virtual information supplied in the way described above is output from the device of a supply destination as an image and a voice or used to update the personal (particularly the profile). Of course, the virtual information may be used for any other purposes.

The personal described above is set by each user and supplied to (registered in) the communication device of another user. In other words, the user of the communication device 100 acquires the personal of another user from another communication device and registers (stores) the same in the communication device 100 as a communication party. The communication device 100 may register the personal of another user for an unlimited or limited period of time. In addition, each user may supply the personal with or without charge.

The user is allowed to have a plurality of characteristics (personalities) as his/her own personal. Although the personal is associated with the user, the personality of the user is actually complicated and hardly classified into a simple specific type in many cases. In addition, the personality is likely to slightly change depending on time or feeling. Moreover, the user generally changes his/her response depending on a communication party. For example, it is general that the user changes a topics or a response depending on whether he/she speaks to a boss at the place of employment or a friend and a family member having an easy relationship with the user and changes the use of language depending on whether he/she speaks to an elderly person or a younger person.

In other words, there is a case that the user to which the personal is supplied requests another user to have a different characteristic as a communication party. As described above, the user generally has multiple personalities. Therefore, for example, the characteristic of the user B requested by the user A is not necessarily the same as that of the user B requested by user C. In addition, a characteristic requested to have as a virtual communication party may not be the same as the characteristic of the real user.

In view of the above circumstances, the personal may have a plurality of characteristics, and the characteristics may be controlled according to a destination to which the personal is supplied. For example, a characteristic A may be supplied to the user A as the personal, while a characteristic B may be supplied to the user B as the personal.

Since various characteristics are given and received like this, the communication device 100 is allowed to realize the virtual communication further responding to the request of the user. That is, the communication device 100 is allowed to improve the convenience of the virtual communication.

Note that the profile includes basic settings and optional settings. The basic settings include information that characterizes the user (personal). The basic settings represent information shared among all the characteristics of the personal. The basic settings may have any content. The optional settings include information that characterizes each characteristic. The optional settings are set for each characteristic. That is, the profile of each characteristic includes the basic settings and the optional settings for the characteristic. The optional settings may have any content.

In addition, the settings of the personal may be registered (retained) in the terminal (such as the communication device 100) of the user or may be registered (retained) in another device such as the server 132. That is, the physical supply source of the personal is a device that has the personal registered (retained) therein and is not limited to the terminal (such as the communication device 100) of the user.

Note that the personal (particularly the profile) described above may have a learning function. That is, the profile of the characteristic may be updated so as to reflect the result of the virtual communication performed at the supply destination of the personal.

(Settings of Personal)

The settings of the personal may be performed in any device. A device in which the settings of the personal are performed and a device in which the settings of the personal are registered (retained) may be or may not be identical to each other. For example, the user may operate the communication device 100 to perform the settings of the personal and have the settings registered (retained) in the communication device 100. In addition, for example, the user may operate the communication device 100 to perform the settings of the personal and have the settings registered (retained) in another device such as the server 132.

Figure 12:
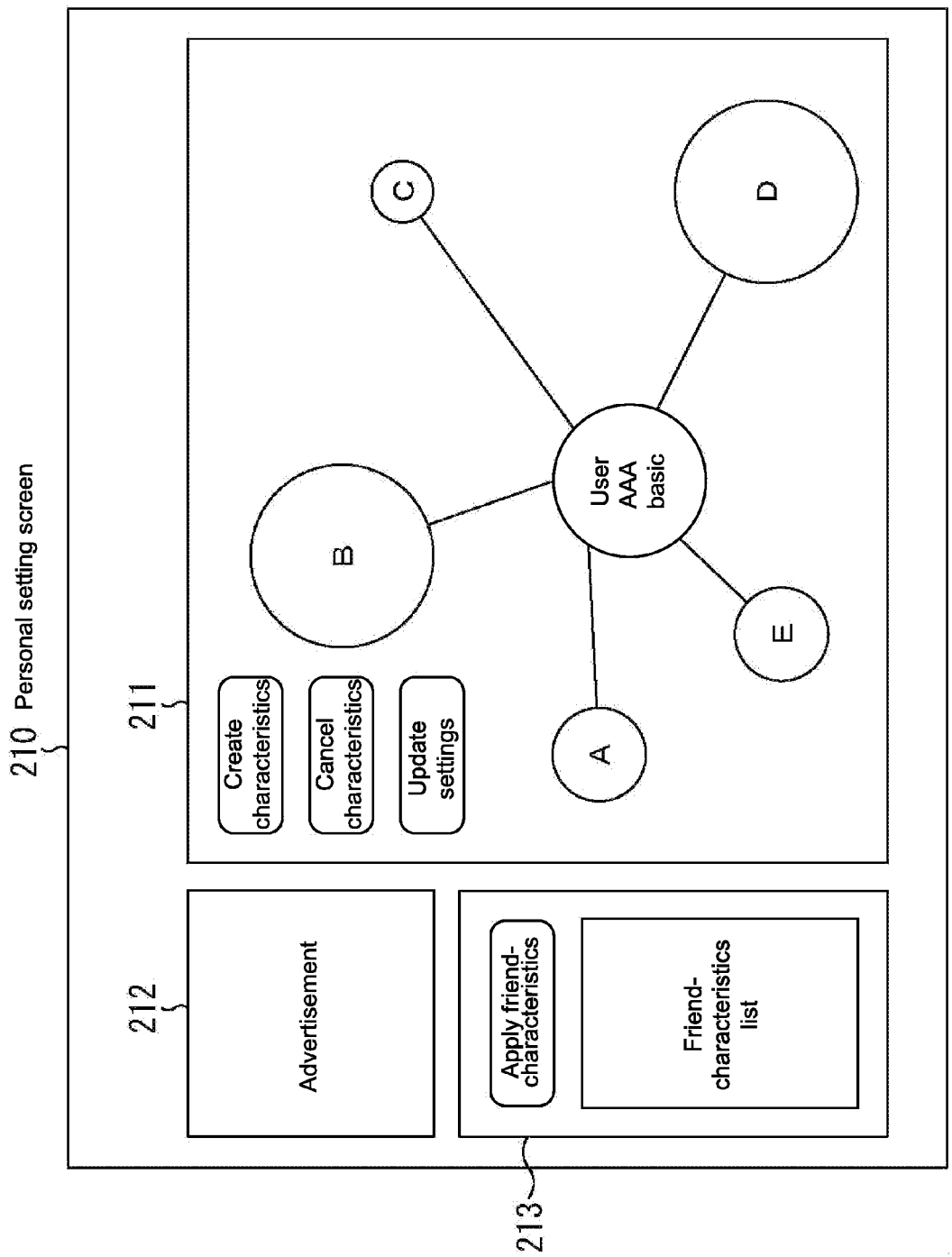
FIG. 12 is a view showing a main configuration example of a personal setting screen.

For example, the user operates a GUI (personal setting screen 210) shown in FIG. 12 to perform the settings of the personal. In the example of FIG. 12, the personal setting screen 210 has a setting region 211 to perform the settings of the profile, an advertisement display region 212 to display advertisements, and a friend-characteristics setting region 213 to register and manage the personals (also called the friend-characteristics) of other users.

The setting region 211 has displayed thereon GUIs such as a "characteristics creation" button, a "characteristics cancellation" button, and a "settings update" button and an image showing the status of current settings. The GUIs of this region are operated to create new characteristics and update/cancel the optional settings and the basic settings of existing characteristics. When the settings are changed, the results of the changes are reflected on the display of this region.

The friend-characteristics setting region 213 has displayed thereon a GUI such as a "friend-characteristics application" button and a "friend-characteristics list" showing a current registration status. The GUI of this region is operated to have the personals (friend-characteristics) of other users registered in the own communication device 100. When the registration status is changed, the result of the change is reflected on the friend-characteristics list. That is, the personals of other users are acquired for each characteristic.

(Functional Blocks)

Figure 13:
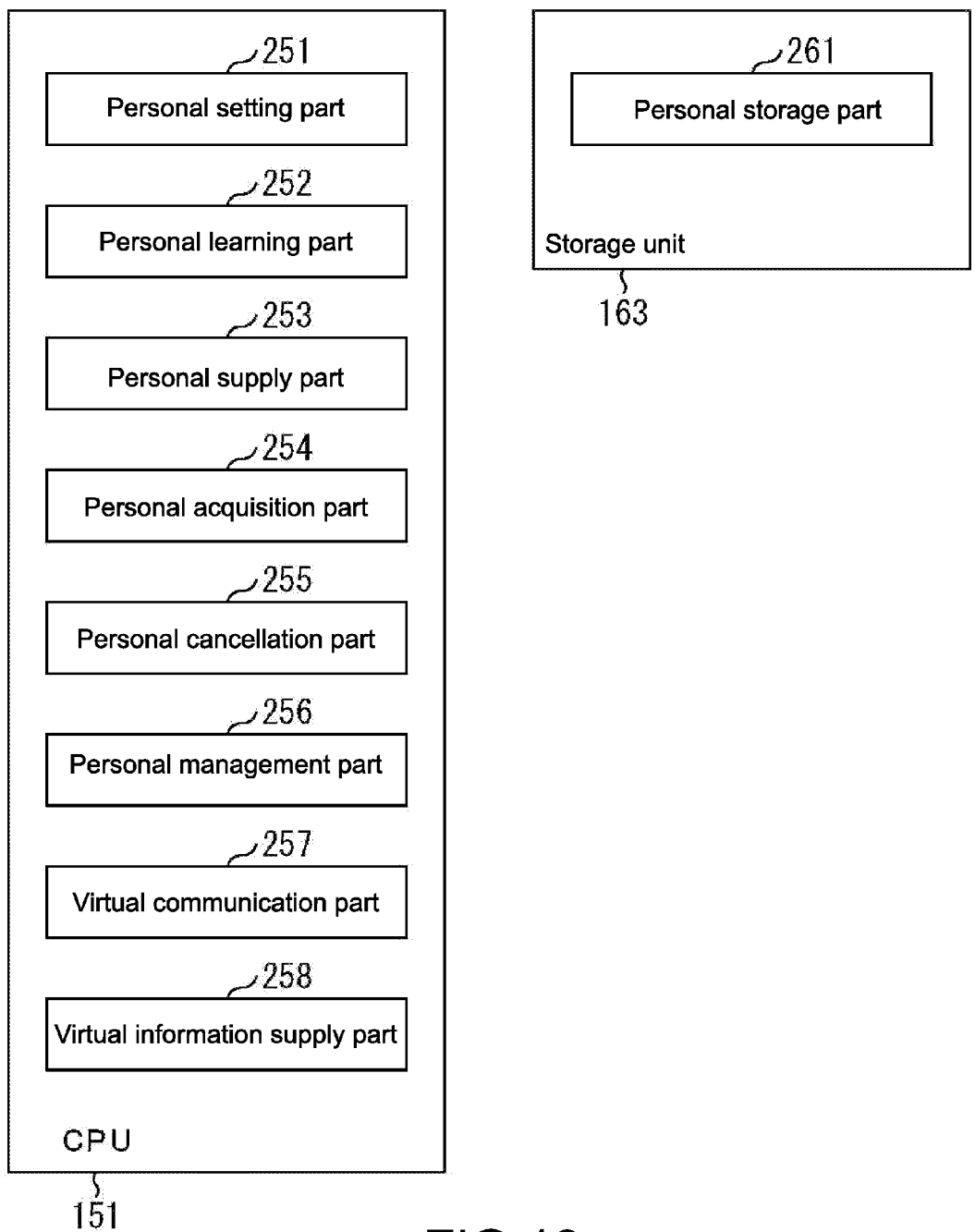
FIG. 13 is a block diagram showing a main configuration example of a CPU and a storage unit.

FIG. 13 shows an example of functional blocks that realizes the virtual communication and the settings of the personal described above. In the example of FIG. 13, the CPU 151 has, as the functional blocks, a personal setting part 251, a personal learning part 252, a personal supply part 253, a personal acquisition part 254, a personal cancellation part 255, a personal management part 256, a virtual communication part 257, and a virtual information supply part 258. These functional blocks may be configured by hardware or software. In this case, the respective functional blocks are realized when the CPU 151 performs a program or data.

The personal setting part 251 performs processing relating to the settings of the personal. The personal learning part 252 performs processing relating to the learning of the personal. The personal supply part 253 performs processing relating to the supply of the personal of the user of an own device. The personal acquisition part 254 performs processing relating to the acquisition of the personal of the user of another device. The personal cancellation part 255 performs processing relating to the cancellation of the personal of the user of another device registered in an own device. The personal management part 256 manages the personal of the user of another device registered in an own device.

The virtual communication part 257 performs processing relating to the virtual communication. The virtual information supply part 258 performs processing relating to the supply of the virtual information.

In addition, the storage unit 163 has a personal storage part 261. The personal storage part 261 is a storage region that stores the information of the personal therein. For example, the personal storage part 261 stores the information of the personal of the user of an own device and the information of the personal (friend-characteristics) of another user acquired from another device. The personal storage part 261 is formed in a part or the whole of the storage region of the storage unit 163.

Next, a description will be given of the flows of the various processing performed by the functional blocks described above.

(Personal Setting Processing)

Figure 14:
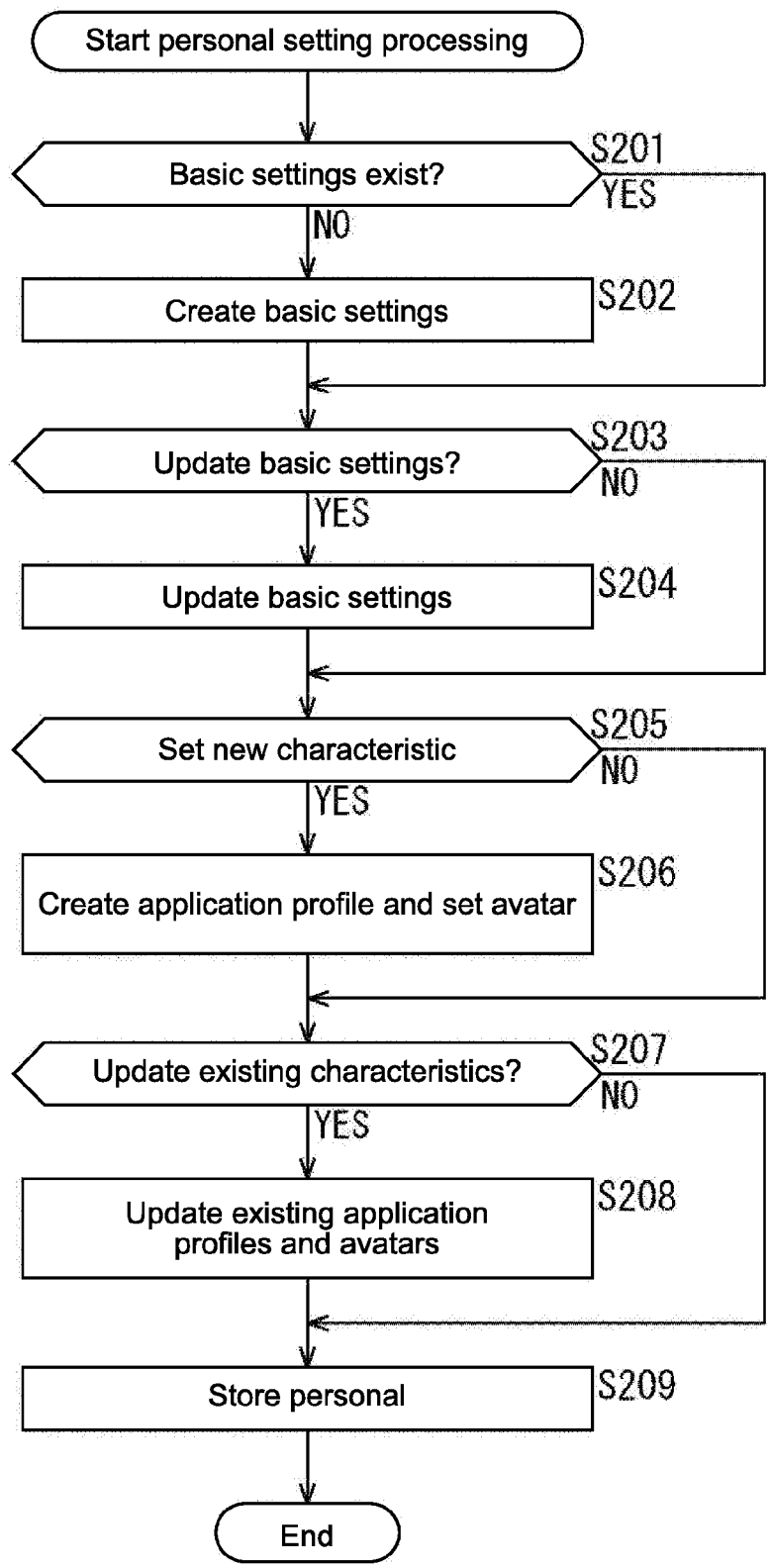
FIG. 14 is a flowchart describing an example of the flow of personal setting processing.

The personal setting part 251 performs personal setting processing when the user performs the settings of his/her own personal or updates the same. A description will be given, with reference to the flowchart of FIG. 14, of an example of the flow of the personal setting processing.

In step S201, the personal setting part 251 controls the personal management part 256 to determine whether the basic settings of the profile of the personal of the user of the own device exist in the personal storage part 261. When the personal setting part 251 determines that the basic settings of the profile do not exist, the processing proceeds to step S202. In step S202, the personal setting part 251 controls the output unit 162 to have a GUI displayed on the display 101 and control the input unit 161 to accept a user's input to create the basic settings of the profile.

When the processing of step S202 ends, the processing proceeds to step S203. On the other hand, when the personal setting part 251 determines in step S201 that the basic settings of the profile exist, the processing proceeds to step S203.

In step S203, the personal setting part 251 determines whether to update the basic settings of the profile based on the user's instruction or the like accepted with the control of, for example, the input unit 161. When the personal setting part 251 determines that the basic settings of the profile are updated, the processing proceeds to step S204. In step S204, the personal setting part 251 controls the output unit 162 to have a GUI displayed on the display 101 and controls the input unit 161 to accept a user's input to update the basic settings of the profile.

When the processing of step S204 ends, the processing proceeds to step S205. On the other hand, when the personal setting part 251 determines in step S203 that the basic settings of the profile are not updated, the processing proceeds to step S205.

In step S205, the personal setting part 251 determines whether to set a new characteristic based on a user's instruction or the like accepted with the control of, for example, the input unit 161. When the personal setting part 251 determines that a new characteristic is set, the processing proceeds to step S206. In step S206, the personal setting part 251 controls the output unit 162 to have a GUI displayed on the display 101 and controls the input unit 161 to accept a user's input to set the new characteristic. For example, the personal setting part 251 creates the optional settings of the profile (also called an application profile) and sets an avatar (as occasion demands).

When the processing of step S206 ends, the processing proceeds to step S207. On the other hand, when the personal setting part 251 determines in step S205 that a new characteristic is not set, the processing proceeds to step S207.

In step S207, the personal setting part 251 determines whether to update the profiles of existing characteristics stored in the personal storage part 261 based on a user's instruction or the like accepted with the control of, for example, the input unit 161. When the personal setting part 251 determines that the profiles of the existing characteristics are updated, the processing proceeds to step S208. In step S208, the personal setting part 251 controls the output unit 162 to have a GUI displayed on the display 101 and controls the input unit 161 to accept a user's input to update the profiles of the existing characteristics. For example, the personal setting part 251 updates the optional settings of the profiles (also called the existing application profiles) of the existing characteristics and updates the avatars of the existing characteristics (as occasion demands).

When the processing of step S208 ends, the processing proceeds to step S209. On the other hand, when the personal setting part 251 determines in step S207 that the profiles of the existing characteristics are not updated, the processing proceeds to step S209.

In step S209, the personal setting part 251 stores the information of the personal created or updated as described above in the personal storage part 261. When the processing of step S209 ends, the personal setting processing ends.

(Personal Supply Processing)

Figure 15:
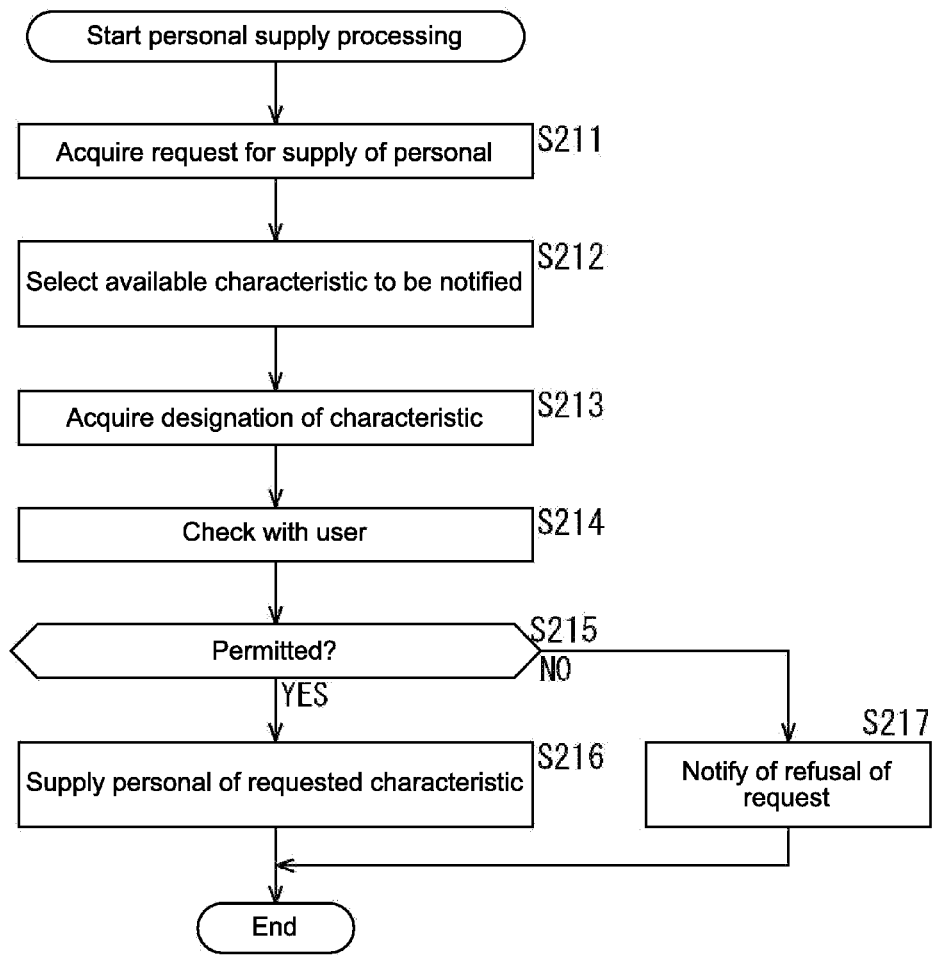
FIG. 15 is a flowchart describing an example of the flow of personal supply processing.

Upon accepting a request for the supply of the personal of its own device from another device, the personal supply part 253 performs personal supply processing. A description will be given, with reference to the flowchart of FIG. 15, of an example of the flow of the personal supply processing.

In step S211, the personal supply part 253 accepts a request for the supply of its personal from another device via the communication unit 164. In step S212, the personal supply part 253 selects an available characteristic stored in the personal storage part 261 via the personal management part 256 and notifies the request source of information showing the selected characteristic via the communication unit 164.

In step S213, the personal supply part 253 acquires the designation of the characteristic from the other device via the communication unit 164. In step S214, the personal supply part 253 controls the output unit 162 to check with the user for the supply of the personal of the designated characteristic through an image or a voice.

In step S215, the personal supply part 253 determines whether the supply of the personal has been permitted based on a user's input accepted with the control of the input unit 161. When the personal supply part 251 determines that the supply of the personal has been permitted, the processing proceeds to step S216.

In step S216, the personal supply part 253 reads the personal of the requested characteristic from the personal storage part 261 via the personal management part 256 and supplies the read personal to the other device, i.e., the request source, via the communication unit 164.

When the processing of step S216 ends, the personal supply processing ends. On the other hand, when the personal supply part 253 determines in step S215 that the supply of the personal has been refused by the user, the processing proceeds to step S217.

In step S217, the personal supply part 253 notifies the other device, i.e., the request source, of the refusal of the request via the communication unit 164. When the processing of step S217 ends, the personal supply processing ends.

(Personal Acquisition Processing)

Figure 16:
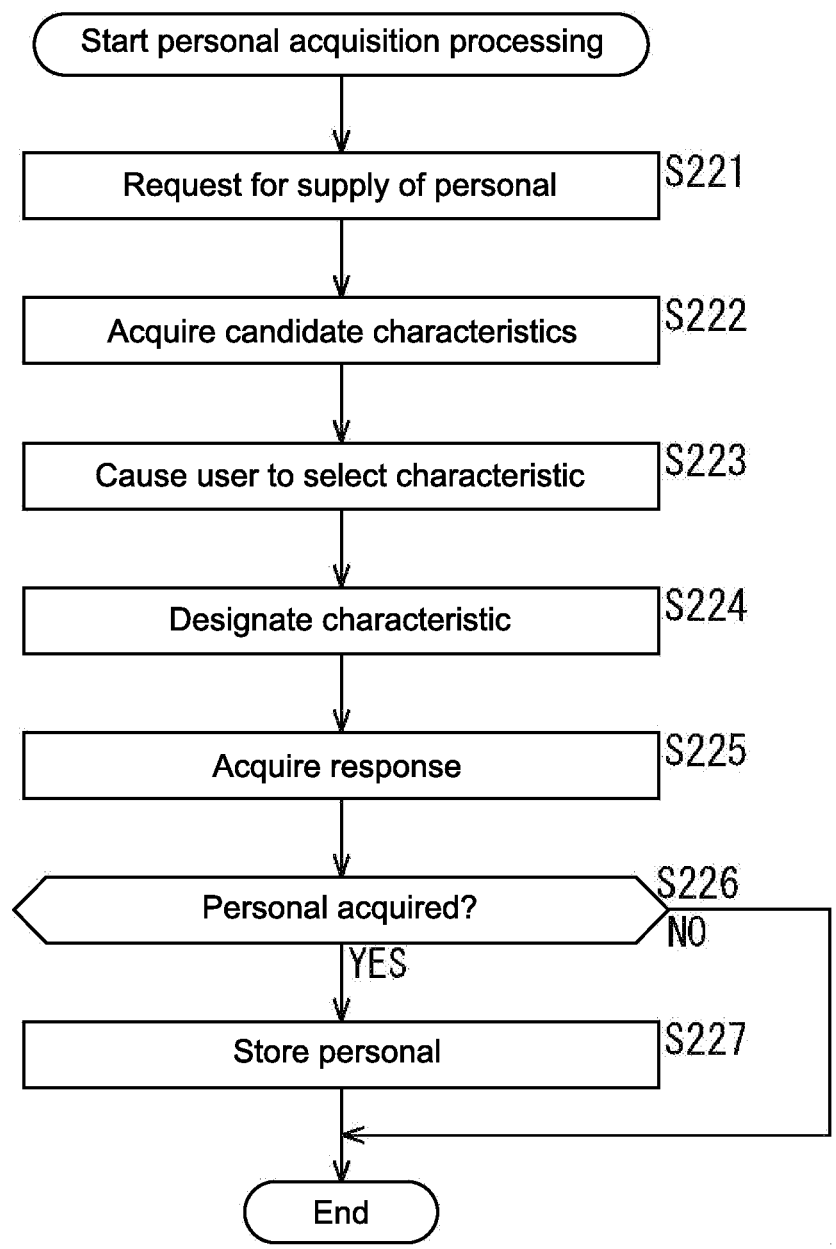
FIG. 16 is a flowchart describing an example of the flow of personal acquisition processing.

When acquiring the personal of another user from another device, the personal acquisition part 254 performs personal acquisition processing. A description will be given, with reference to the flowchart of FIG. 16, of an example of the flow of the personal acquisition processing.

In step S221, the personal acquisition part 254 requests another desired communication device to supply its personal via the communication unit 164 according to a user's instruction accepted with the control of the input unit 161.

In step S222, the personal acquisition part 254 acquires available candidate characteristics from the communication device of the request destination via the communication unit 164. In step S223, for example, the personal acquisition part 254 controls the output unit 162 to have a GUI for the selection of the characteristics displayed on the display 101 and controls the input unit 161 to accept a user's operation on the GUI to cause the user to select any of the characteristics.

In step S224, the personal acquisition part 254 supplies the designation of the desired characteristic to the communication device of the request destination via the communication unit 164 according to the accepted user's instruction.

In step S225, the personal acquisition part 254 acquires a response to the designation of the characteristic from the communication device of the request destination via the communication unit 164. In step S226, the personal acquisition part 254 determines whether the personal has been acquired as the response. When the personal acquisition part 254 determines that the personal has been acquired, the processing proceeds to step S227.

In step S227, the personal acquisition part 254 causes the personal storage part 261 to store the acquired personal therein. When the processing of step S227 ends, the personal acquisition processing ends.

On the other hand, when the personal acquisition part 254 determines that the personal has not been acquired, the personal acquisition processing ends.

(Personal Cancellation Processing)

Figure 17:
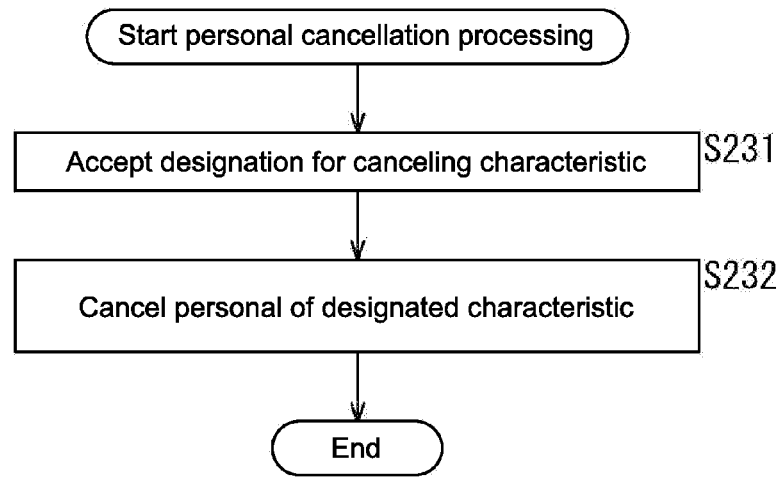
FIG. 17 is a flowchart describing an example of the flow of personal cancellation processing.

When cancelling the personal (existing personal) stored in the personal storage part 261, the personal cancellation part 255 performs personal cancellation processing. A description will be given, with reference to the flowchart of FIG. 17, of an example of the flow of the personal cancellation processing.

In step S231, the personal cancellation part 255 controls the input unit 161 and the output unit 162 to accept the designation of a characteristic to be cancelled by the user.

In step S232, the personal cancellation part 255 cancels the personal of the characteristic designated in step S231 from the personal storage part 261 via the personal management part 256.

When the processing of step S232 ends, the personal cancellation processing ends.

(Virtual Communication Processing)

When realizing the virtual communication, the virtual communication part 257 performs virtual communication processing. A description will be given, with reference to the flowchart of FIG. 18, of an example of the flow of the virtual communication processing.

In step S241, the virtual communication part 257 controls the input unit 161 to accept a user's instruction and determines whether to start the virtual communication based on the accepted user's instruction. The virtual communication part 257 is on standby until determining the start of the virtual communication.

When the virtual communication part 257 determines in step S241 that the virtual communication is started, the processing proceeds to step S242.

In step S242, the virtual communication part 257 activates a personal having an appropriate characteristic as a party on the virtual communication among personals stored in the personal storage part 261 via the personal management part 256.

In step S243, the virtual communication part 257 controls the input unit 161 to accept a user's input. In step S244, the virtual communication part 257 generates a response by the activated (operated) personal to the user's input accepted in step S243.

In step S245, the virtual communication part 257 generates a log of the virtual communication. In step S246, the virtual communication part 257 determines whether to end the virtual communication. When the virtual communication part 257 determines that the virtual communication is not ended, the processing returns to step S243 to perform the processing subsequent to the processing of step S243. On the other hand, when the virtual communication part 257 determines in step S246 that the virtual communication is ended, the virtual communication part 257 ends the virtual communication processing to end the virtual communication.

(Virtual Information Supply Processing)

Figure 19:
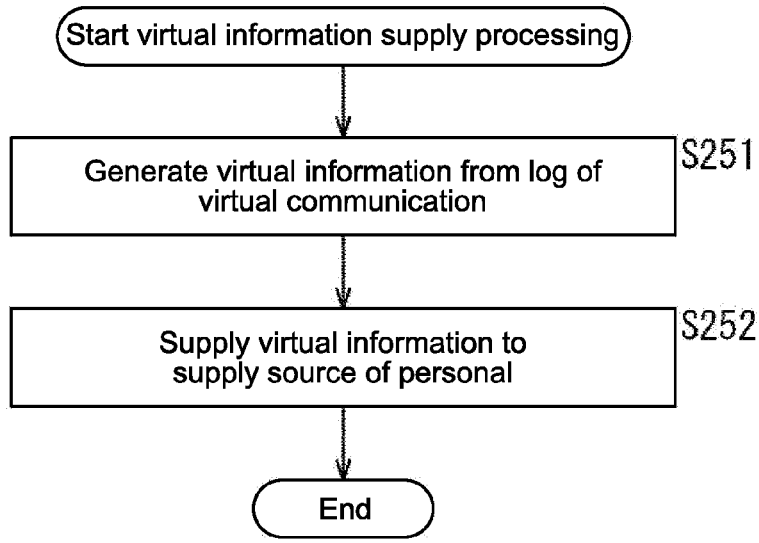
FIG. 19 is a flowchart describing an example of the flow of virtual information supply processing.

When supplying the virtual information, the virtual information supply part 258 performs virtual information supply processing. A description will be given, with reference to the flowchart of FIG. 19, of an example of the flow of the virtual information supply processing.

Figure 18:
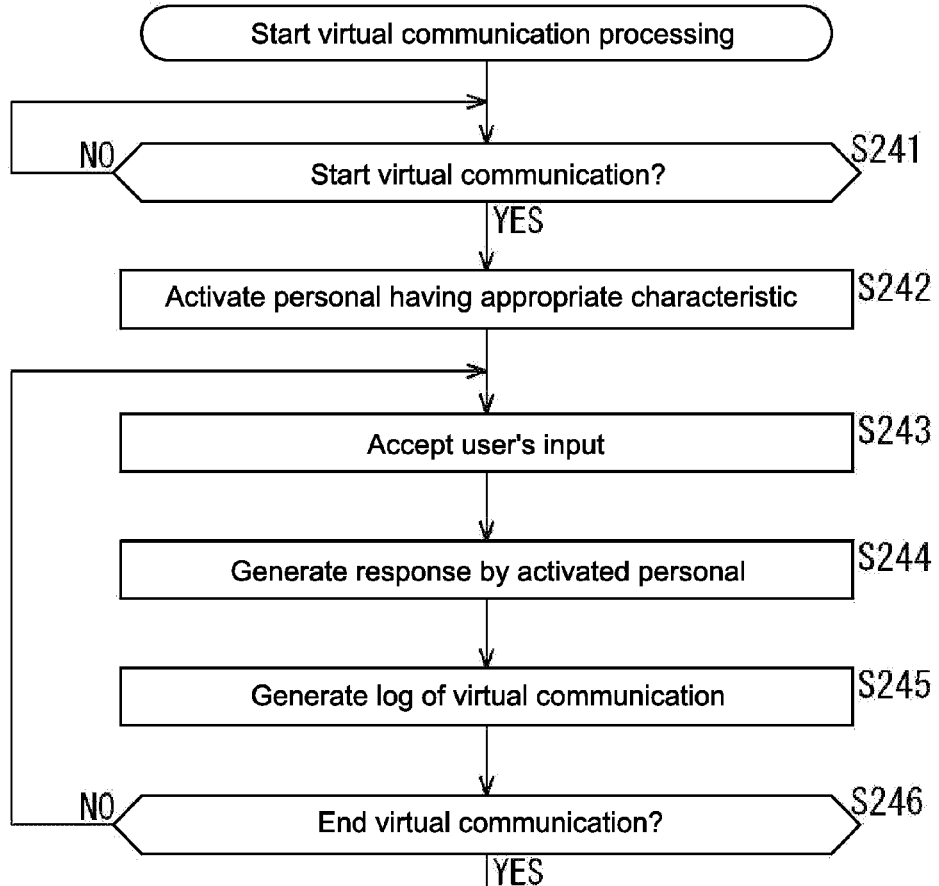
FIG. 18 is a flowchart describing an example of the flow of virtual communication processing.

In step S251, the virtual information supply part 258 generates virtual information from the log of the virtual communication generated in step S245 of FIG. 18.

In step S252, the virtual information supply part 258 supplies, via the communication unit 164, the virtual information generated in step S251 to the communication device of the supply source of the personal used in the virtual communication.

When the processing of step S252 ends, the virtual information supply processing ends.

Note that the virtual information supply processing may be performed at any timing. For example, the virtual information supply processing may be performed in parallel with the virtual communication processing of FIG. 18, and the virtual information acquired from the log of the virtual communication processing may be supplied during the virtual communication. In addition, the virtual information supply processing may be performed at prescribed timing after the virtual communication processing, and the virtual information may be generated and supplied from a log of the virtual communication.

(Learning Processing)

Figure 20:
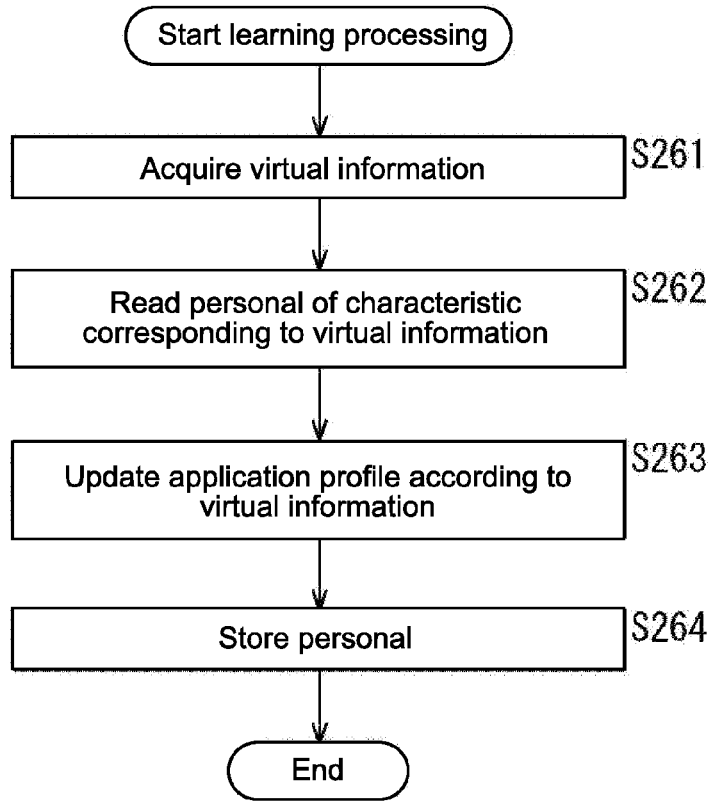
FIG. 20 is a flowchart describing an example of the flow of learning processing.

When updating the personal (particularly the profile) used in the virtual communication with the virtual information supplied as described above, the personal learning part 252 performs learning processing. A description will be given, with reference to the flowchart of FIG. 20, of an example of the flow of the learning processing.

In step S261, the personal learning part 252 acquires, via the communication unit 164, virtual information from another communication device having supplied its personal.

In step S262, the personal learning part 252 reads, via the personal management part 256, a personal having a characteristic corresponding to the virtual information acquired in step S261 from the personal storage part 261.

In step S263, the personal learning part 252 updates the optional settings of the profile (the application profile) of the personal read in step S262 according to the virtual information acquired in step S261.

In step S264, the personal learning part 252 supplies the personal updated in step S263 to the personal storage part 261 via the personal management part 256 and causes the personal storage part 261 to store the personal therein. When the processing of step S264 ends, the learning processing ends.

With the various processing as described above, the communication device 100 is allowed to realize the virtual communication and improve the convenience of the communication.

3. Third Embodiment (Switching of Communication)

Note that the virtual communication described above may be performed regardless of whether connection to another communication device is established. For example, the user may perform the virtual communication (first communication) with priority although he/she is allowed to perform the live communication (second communication).

In addition, the user may switch the communication to be performed. That is, the communication device 100 is allowed to establish connection to the communication device of a communication party during the virtual communication, end the virtual communication, and start the live communication. Conversely, for example, the communication device 100 is allowed to cut off connection to the communication device of a communication party during the live communication, end the live communication, and start the virtual communication.

Thus, the communication device 100 is allowed to realize the communication responding to, for example, the demand of the user and improve the convenience of the communication.

Figure 21:
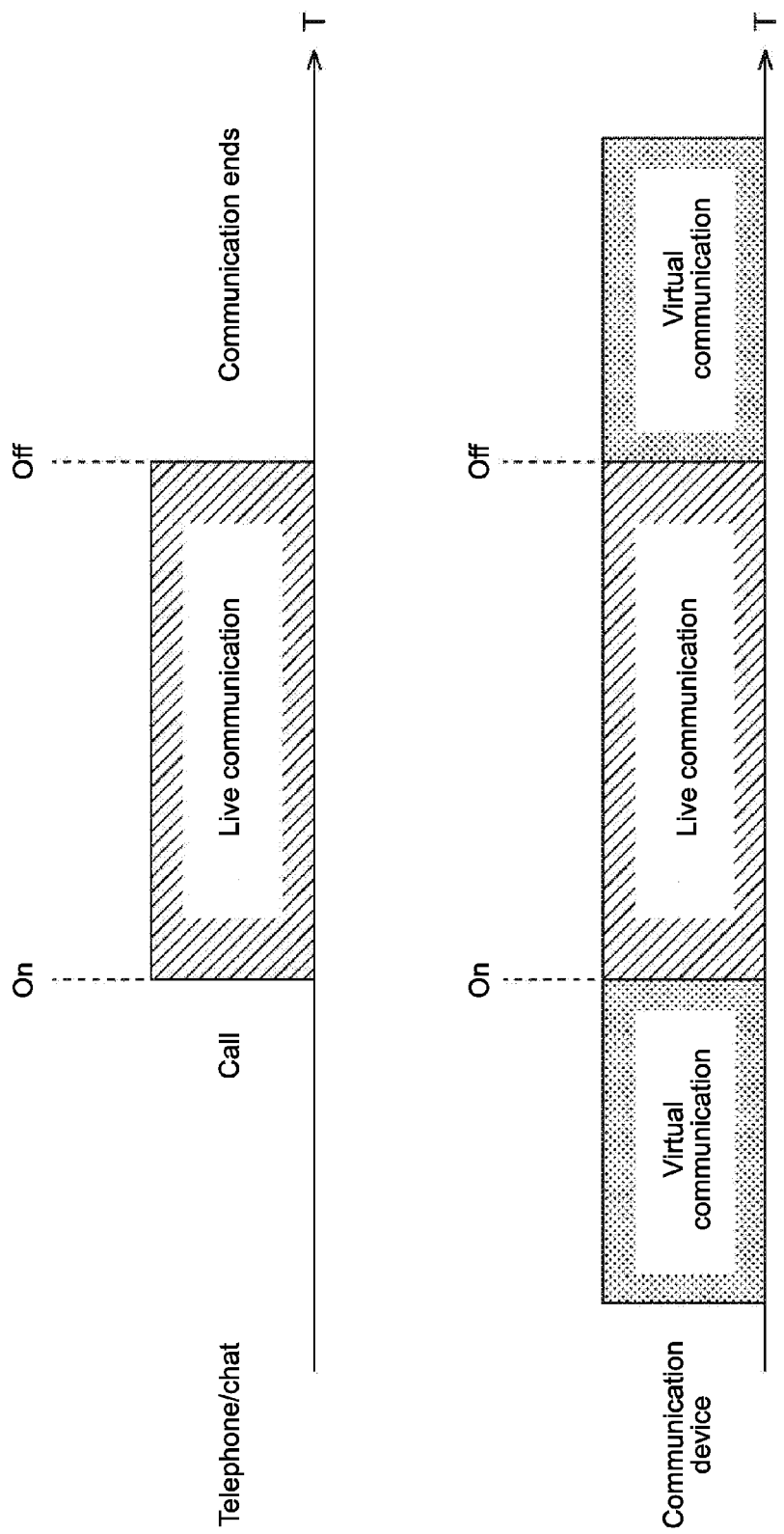
FIG. 21 is a view describing an example of a communication switching state.

Meanwhile, in known telephone-call systems using telephones, TV-conference systems, chat systems, or the like, connection between persons is established when one person calls another person and then the other person replies to the call, and live communication such as a telephone call is performed as shown on the upper side of FIG. 21. Accordingly, the user is requested to be on standby until he/she is allowed to start the live communication with the establishment of the connection. Therefore, there is a likelihood that the convenience of the live communication is reduced.

In addition, in the known telephone-call systems using telephones, the TV-conference systems, the chat systems, or the like, the connection between persons is cut off when one of or both the persons perform cut-off processing, and the live communication ends at the moment at which the connection is cut off. Accordingly, both the persons who have performed the live communication are not allowed to perform the communication after the cut-off processing. The persons are desired to establish the connection to perform the communication again, for example, when they forget about telling a message.

Therefore, the persons are requested to perform a complicated operation and be on standby again for the establishment of the connection. Thus, there is a likelihood that the convenience of the live communication is reduced.

In order to address this problem, the communication device 100 is allowed to perform the virtual communication as described above and switch from the virtual communication to the live communication.

Accordingly, as shown on the lower side of FIG. 21, the communication device 100 is allowed to perform the virtual communication with the personal of its communication party before the live communication. Further, the communication device 100 is allowed to call the communication party and establish connection to the communication party during the virtual communication and switch to the live communication.

Accordingly, the user is allowed to continuously perform the communication without being on standby.

In addition, the communication device is allowed to supply the virtual information of the virtual communication to the communication party at the calling or during the virtual communication before the calling. Accordingly, the communication party is allowed to recognize the contents of the virtual communication based on the virtual information and start the live communication with the recognition of the contents. Thus, the communication device 100 is allowed to switch from the virtual communication to the live communication so as to make the user feel more natural.

Moreover, the communication device 100 is allowed to switch from the live communication to the virtual communication with the personal of the communication party. That is, the user is allowed to perform the virtual communication with the personal of the communication party in succession to the live communication. Then, the communication device 100 is allowed to supply the virtual information to the communication party. Accordingly, even if the user forgets about telling information during the live communication, he/she is allowed to easily tell the information during the virtual communication in succession to the live communication.

Furthermore, the communication device 100 is allowed to switch from the virtual communication to the live communication again in the same way as the above. That is, the user is allowed to continuously perform the communication without being on standby.

As described above, the communication device 100 is allowed to improve the convenience of the communication.

(Functional Blocks)

Figure 22:
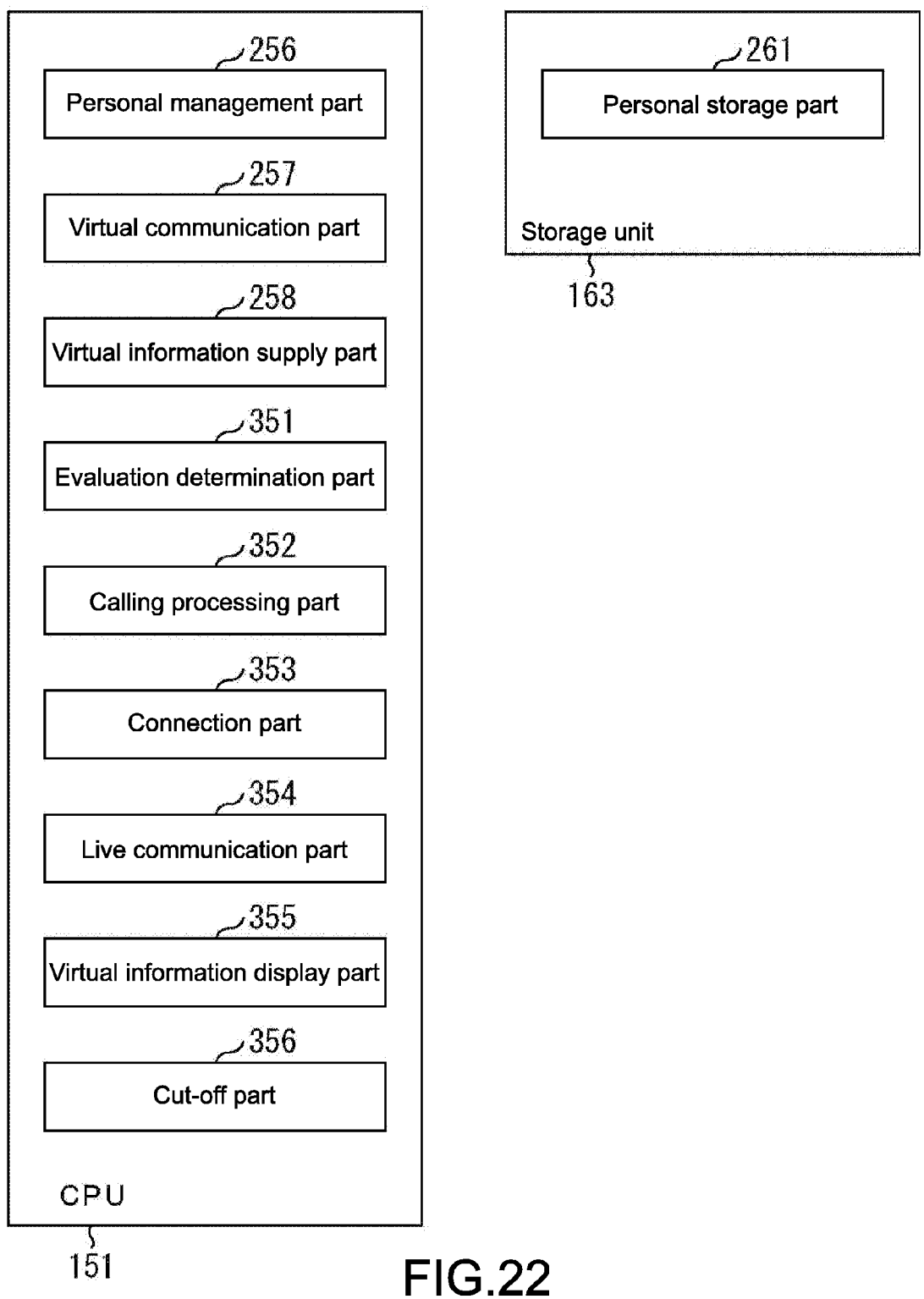
FIG. 22 is a block diagram showing a main configuration example of the CPU and the storage unit.

FIG. 22 shows an example of functional blocks for realizing the switching of the communication as described above. In the example of FIG. 22, the CPU 151 has, as the functional blocks, the personal management part 256, the virtual communication part 257, the virtual information supply part 258, an evaluation determination part 351, a calling processing part 352, a connection part 353, a live communication part 354, a virtual information display part 355, and a cut-off part 356. These functional blocks may be configured by hardware or software. In this case, the respective functional blocks are realized when the CPU 151 performs a program or data.

The evaluation determination part 351 performs processing relating to the analysis, the evaluation, the switch determination, or the like of a user's input on the virtual communication. The calling processing part 352 performs processing relating to the calling for establishing the connection. The connection part 353 performs processing relating to the establishment of the connection. The live communication part 354 performs processing relating to the live communication. The virtual information display part 355 performs processing relating to the display of the virtual information. The cut-off part 356 performs processing relating to the cut-off of the connection.

In addition, the storage unit 163 has the personal storage part 261.

Next, a description will be given of the flows of the various processing performed by the functional blocks described above.

(Switch Processing)

For example, the communication device 100 may attempt to switch to the live communication with the start of the virtual communication. That is, the live communication is performed prior to the virtual communication. In this case, the virtual communication is performed as a stopgap until the start of the live communication.

Figure 23:
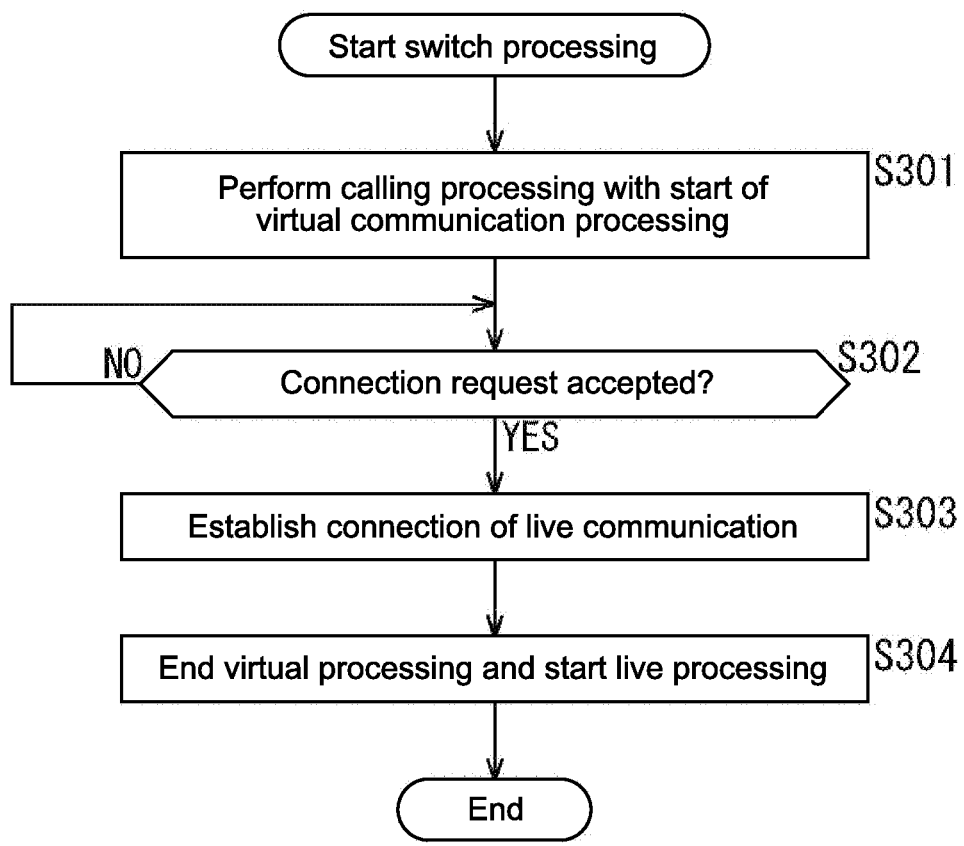
FIG. 23 is a flowchart describing an example of the flow of switch processing.

A description will be given, with reference to the flowchart of FIG. 23, of an example of the flow of switch processing performed by the communication device 100 in this case.

In step S301, with the start of the virtual communication processing of the virtual communication part 257, the calling processing part 352 performs processing for calling a communication party on a communication device corresponding to the characteristic of the communication party of the virtual communication via the communication device 164.

In step S302, the calling processing part 352 determines whether a connection request has been accepted from the communication device of the communication party via the communication part 164 and is on standby until determining the acceptance of the connection request. When the calling processing part 352 determines that the connection request has been accepted, the processing proceeds to step S303.

In step S303, the connection part 353 establishes the connection of the live communication. In step S304, the virtual communication part 257 ends the virtual communication processing, while the live communication part 354 starts the live communication processing with the communication party of the communication device that has been brought into the connection in step S303.

When the communication methods are switched as described above, the switch processing ends.

(Display of Virtual Information)

Note that during the virtual communication, the virtual information may be displayed on the communication device of a real communication party corresponding to a characteristic, i.e., the communication party of the virtual communication.

Figure 24:
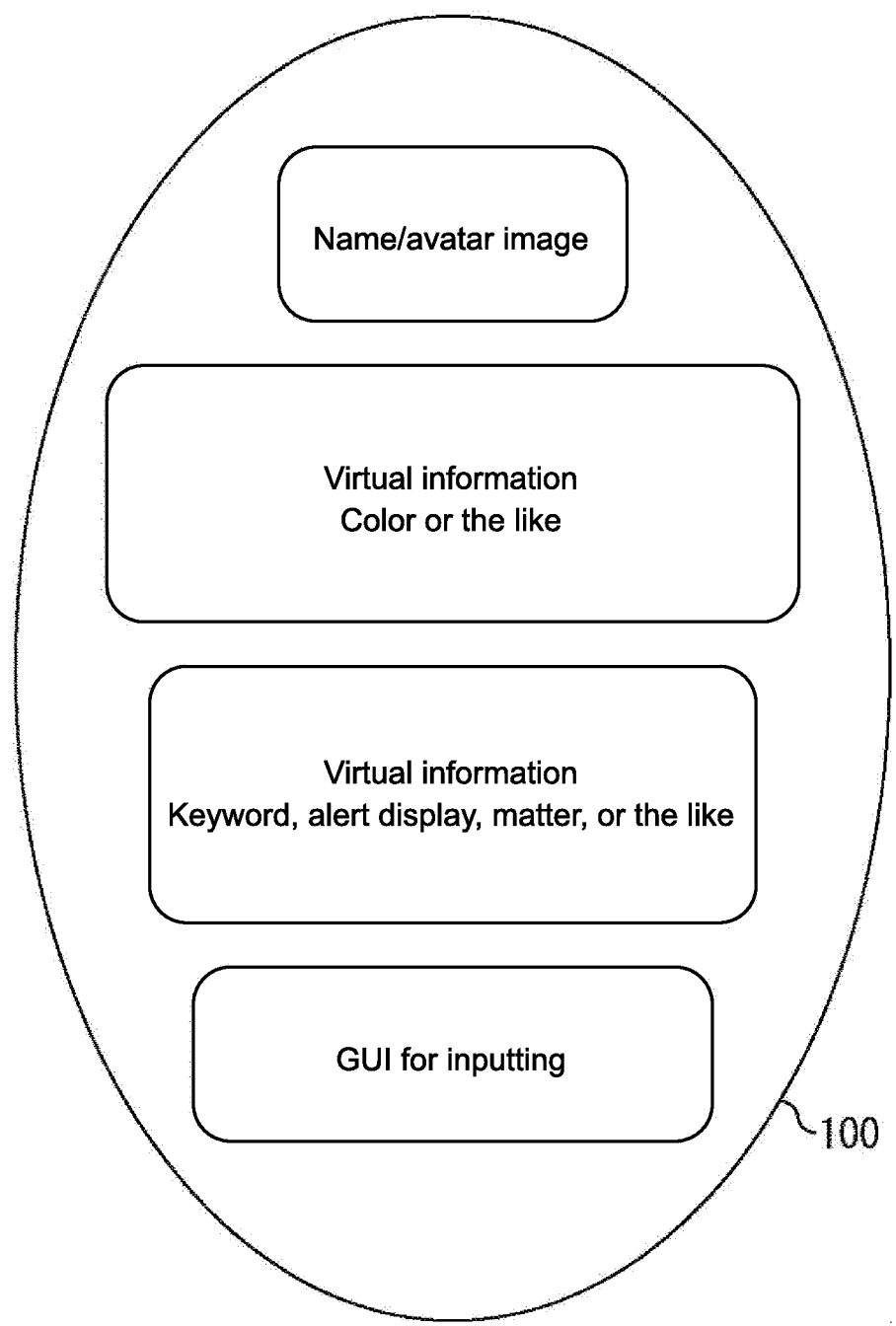
FIG. 24 is a view describing a display example.

FIG. 24 shows a display example of the virtual information. As shown in the example of FIG. 24, besides a name and an avatar image, abstract virtual information such as a color, concrete virtual information such as a keyword, an alert display, and matter, a GUI for inputting, or the like may be displayed on the communication device 100 of a communication party.

Figure 25A:
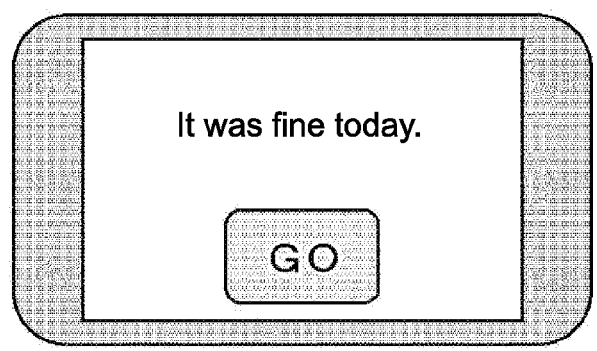
FIGS. 25A, 25B, and 25C are views describing display examples.
Figure 25B:
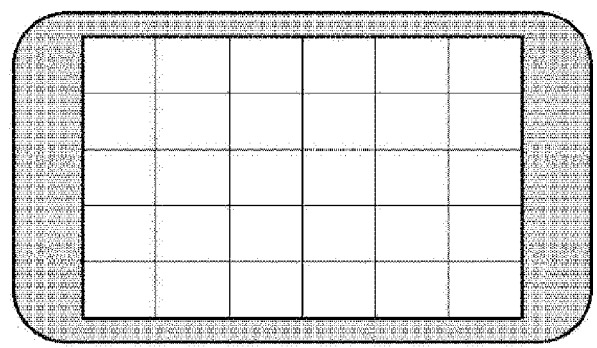

In addition, as shown in the example of FIG. 25A, the contents of the virtual communication may be displayed in a text form. Moreover, for example, an image showing a state in which the virtual communication is being performed may be displayed. In the example of FIG. 25B, closed sliding doors are displayed as an image showing a state in which the virtual communication is being performed, and the voice of the virtual communication is output softly. That is, it is expressed as if the virtual communication were being performed beyond the sliding doors.

Figure 25C:
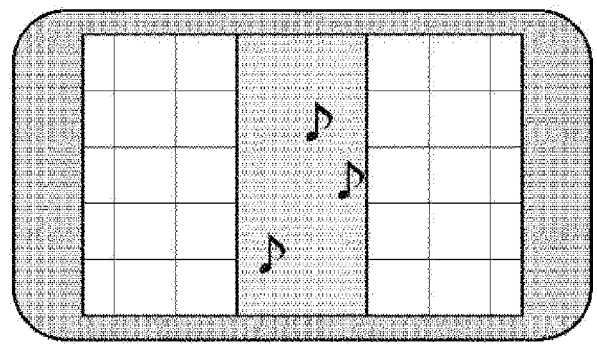

Moreover, as shown in FIG. 25C, the user may open/close the sliding doors. For example, when the user opens the sliding doors with the operation of the input unit 161 such as a touch panel as shown in FIG. 25C, the voice of the virtual communication may be output loudly according to the opening degree of the sliding doors. In addition, according to the opening degree of the sliding doors, an image taken by the camera 102 of a communication party may be displayed at a part at which the sliding doors are opened. That is, a larger part of the image may be displayed when the sliding doors are opened more widely.

(Virtual Information Display Processing)

Figure 26:
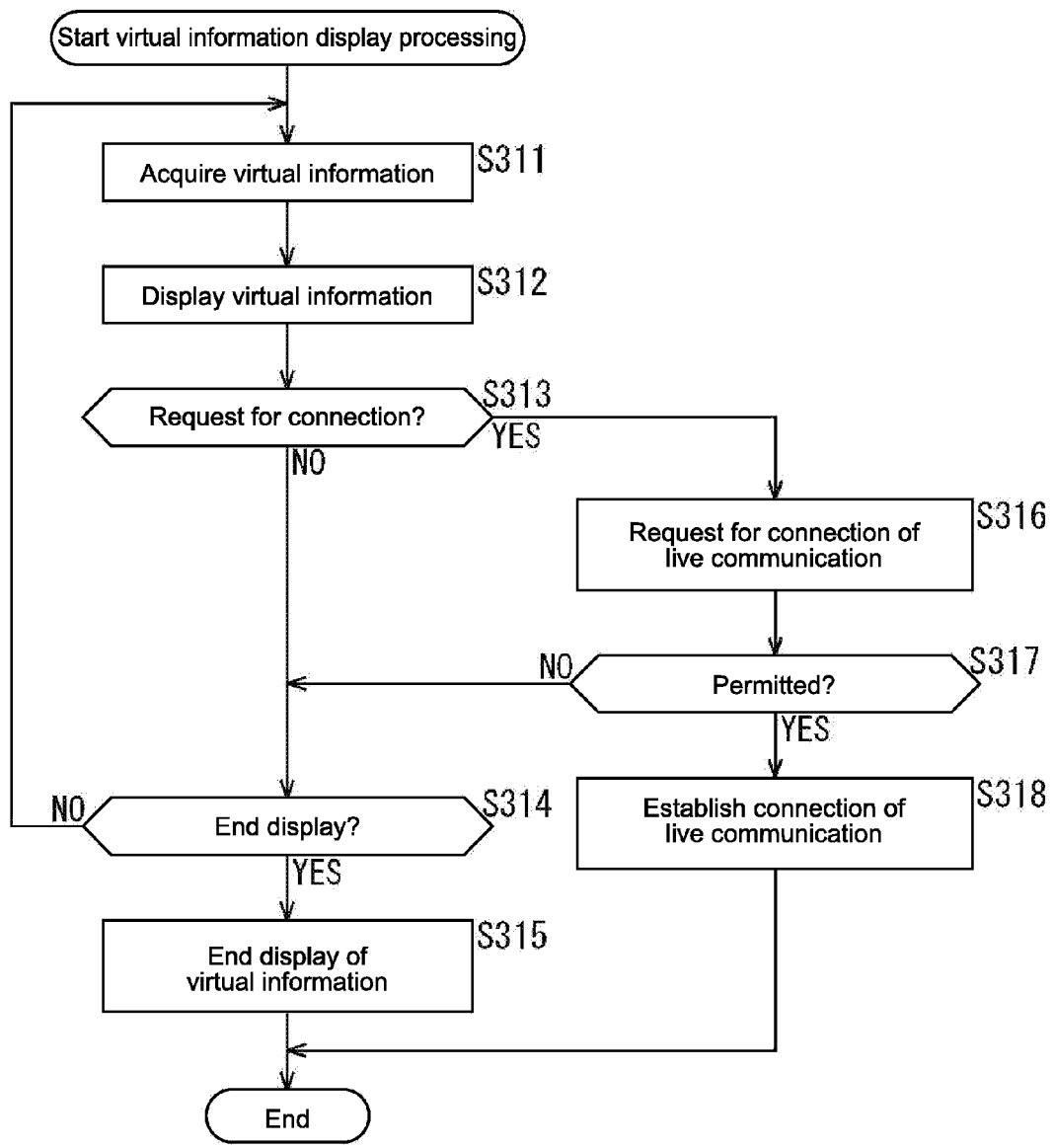
FIG. 26 is a flowchart describing an example of the flow of virtual information display processing.

The communication device 100 of a real communication party corresponding to a characteristic, i.e., the communication party of the virtual communication, performs virtual information display processing to display the virtual information supplied in the way as described above. A description will be given, with reference to the flowchart of FIG. 26, of an example of the flow of the virtual information display processing.

In step S311, the virtual information display part 355 acquires the virtual information via the communication unit 164. In step S312, the virtual information display part 355 controls the output unit 162 to have the virtual information displayed on the display 101.

In step S313, the calling processing part 352 determines whether to request for the connection based on a user's input accepted with the control of the input unit 161. When the calling processing part 352 determines that the request for the connection is not made, the processing proceeds to step S314.

In step S314, the virtual information display part 355 determines whether to end the display of the virtual information. When the virtual information display part 355 determines that the display of the virtual information is not ended, the processing returns to step S311 to perform the processing subsequent to the processing of step S311.

On the other hand, when the virtual information display part 355 determines in step S314 that the display of the virtual information is ended, the processing proceeds to step S315. In step S315, the virtual information display part 355 ends the display of the virtual information. When the processing of step S315 ends, the virtual information display processing ends.

On the other hand, when the calling processing part 352 determines in step S313 that the request for the connection is made, the processing proceeds to step S316.

In step S316, the calling processing part 352 requests for the connection of the live communication. In step S317, the calling processing part 352 determines whether the request for the connection has been permitted by a request destination via the communication unit 164. When the calling processing part 352 determines that the request for the connection has not been permitted, the processing returns to step S314 to perform the processing subsequent to the processing of step S314.

On the other hand, when the calling processing part 352 determines in step S317 that the request for the connection has been permitted, the processing proceeds to step S318.

In step S318, the connection part 353 establishes the connection of the live communication. Thus, the live communication part 354 starts the live communication.

When the processing of step S318 ends, the virtual information display processing ends.

(Switch Processing)

The communication device 100 may perform switch processing and calling processing at the occurrence of a prescribed state, for example, when a prescribed keyword appears in the virtual communication rather than at the beginning of the virtual communication. A description will be given, with reference to the flowchart of FIG. 27, of an example of the flow of the switch processing.

In step S321, the evaluation determination part 351 analyzes and evaluates a user's input in the virtual communication. Although the analysis and evaluation of the user's input may be performed according to any content and method, its specific example will be described later.

In step S322, the evaluation determination part 351 determines whether to switch to the live communication according to the evaluation result calculated in step S321. When the evaluation determination part 351 determines that the virtual communication is not allowed to switch to the live communication, the processing proceeds to step S323.

In step S323, the calling processing part 352 performs calling processing according to the evaluation result calculated in step S321. For example, when evaluating that the significance of the switching to the live communication is not high, the calling processing part 352 performs the calling processing to notify the communication party of the fact that the virtual communication may switch to the live communication. In addition, for example, when evaluating that the significance of the switching to the live communication is high to some extent, the calling processing part 352 performs the calling processing to suggest the communication party to switch to the live communication.

Moreover, for example, when evaluating that the significance of the switching to the live communication is extremely high, the calling processing part 352 performs the calling processing with an alert display on the communication party.

When the processing of step S323 ends, the processing proceeds to step S324. On the other hand, when the evaluation determination part 351 determines in step S322 that the virtual communication is not allowed to switch to the live communication, the processing proceeds to step S324.

In step S324, the connection part 353 determines whether a connection request has been accepted from another communication device via the communication unit 164. When the connection part 353 determines that the connection request has not been accepted, the processing returns to step S321 to perform the processing subsequent to the processing of step S321.

On the other hand, when the connection part 353 determines in step S324 that the connection request has been accepted, the processing proceeds to step S325.

In step S325, the connection part 353 controls the output unit 162 and the input unit 161 to accept a user's instruction and determines whether to establish the connection. When the connection part 353 determines that the connection is not established, the processing proceeds to step S326.

In step S326, the communication part 353 refuses the connection request from the connection request source via the communication unit 164. When the processing of step S326 ends, the processing returns to step S321 to perform the processing subsequent to the processing of step S321.

On the other hand, when the connection part 353 determines in step S325 that the connection is established, the processing proceeds to step S327.

In step S327, the connection part 353 establishes the connection of the live communication. In step S328, the virtual communication part 257 ends the virtual communication, while the live communication part 354 starts the live communication. When the processing of step S328 ends, the switch processing ends.

(Evaluation Processing)

A description will be given, with reference to the flowchart of FIG. 28, of an example of the flow of the evaluation processing performed in step S321 of FIG. 27.

In step S331, the evaluation determination part 351 analyzes the tone of a user's voice accepted with the control of the input unit 161. In step S332, the evaluation determination part 351 evaluates the tone analysis result of step S331. For example, the evaluation determination part 351 evaluates whether the tone of the user's voice falls within the range of the tone of the voice of a general conversation. When evaluating that the tone of the user's voice falls within the range of the tone of the voice of the general conversation, the evaluation determination part 351 determines that the virtual communication is not allowed to switch to the live communication in step S322 of FIG. 27.

Figure 27:
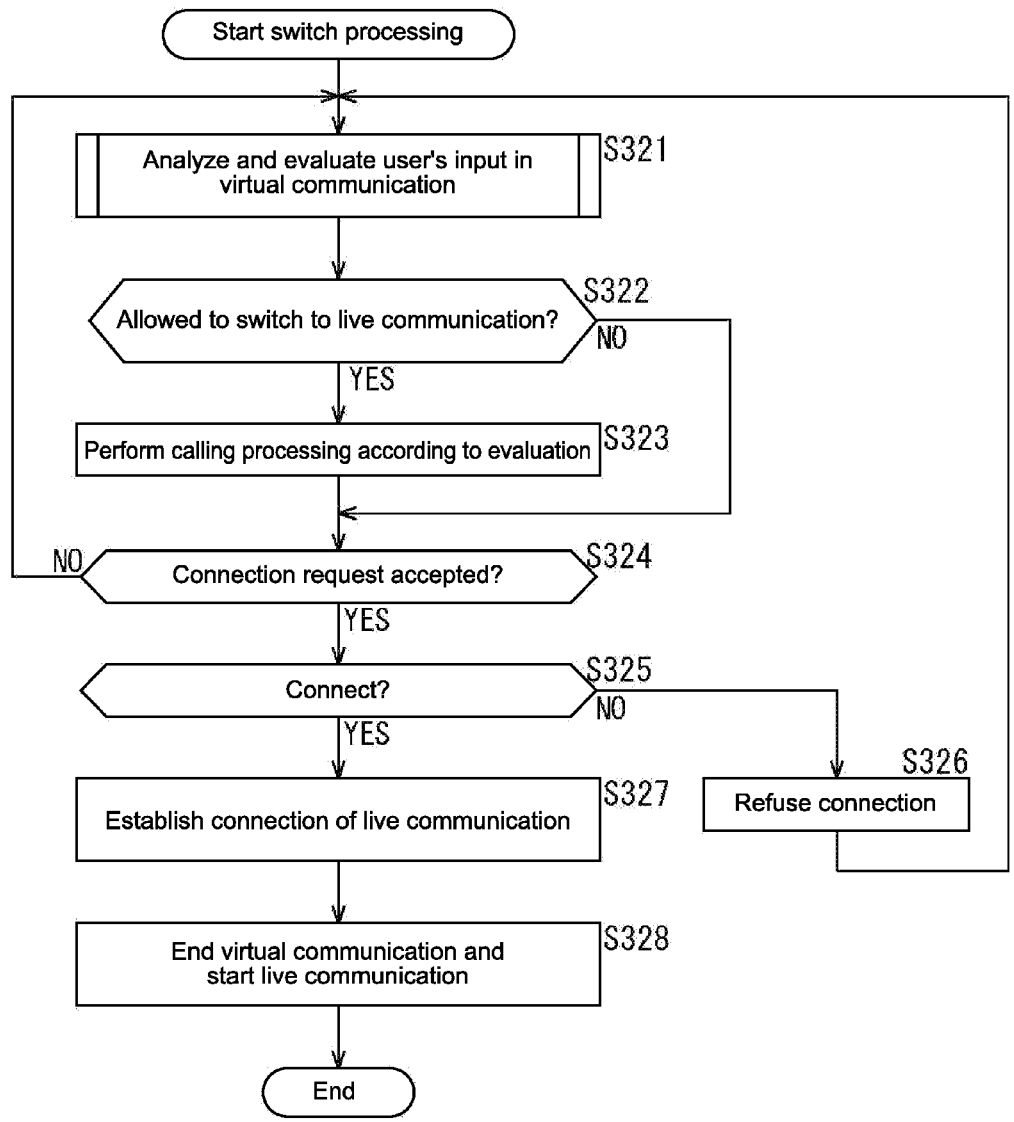
FIG. 27 is a flowchart describing an example of the flow of switch processing.
Figure 28:
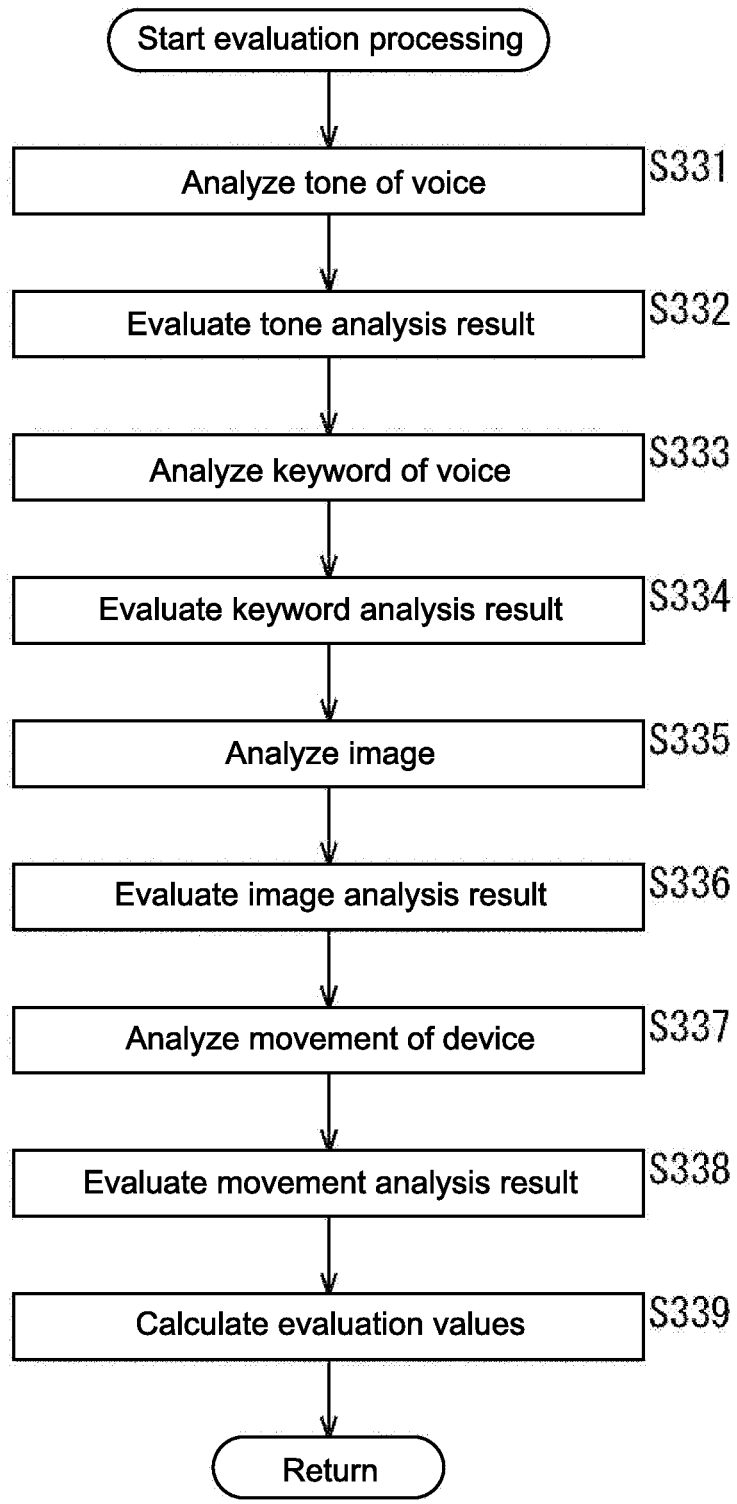
FIG. 28 is a flowchart describing an example of the flow of evaluation processing.

Conversely, when evaluating that the tone of the user's voice falls outside the range of the tone of the general conversation, the evaluation determination part 351 determines that the virtual communication is allowed to switch to the live communication in step S322 of FIG. 27. In addition, the evaluation determination part 351 may determine to what extent the virtual communication is allowed to switch to the live communication based on the evaluation result.

In step S333, the evaluation determination part 351 analyzes the keyword of the user's voice accepted with the control of the input unit 161. In step S334, the evaluation determination part 351 evaluates the keyword analysis result of step S333. For example, the evaluation determination part 351 evaluates whether the user's voice includes a prescribed negative keywords. When evaluating that the user's voice does not include the negative keyword, the evaluation determination part 351 determines that the virtual communication is not allowed to be switch to the live communication in step S322 of FIG. 27. Conversely, when evaluating that the user's voice includes the negative keyword, the evaluation determination part 351 determines that the virtual communication is allowed to switch to the live communication in step S322 of FIG. 27. In addition, the evaluation determination part 351 may determine to what extent the virtual communication is allowed to switch to the live communication based on the evaluation result.

In step S335, the evaluation determination part 351 analyzes an image taken by the camera 102 with the control of the input unit 161. In step S336, the evaluation determination part 351 evaluates the image analysis result of step S335. For example, when the image includes a user's face, the evaluation determination part 351 evaluates whether a user's facial expression falls within a normal range. When evaluating that the user's facial expression falls within the normal range, the evaluation determination part 351 determines that the virtual communication is not allowed to switch to the live communication in step S322 of FIG. 27. Conversely, when evaluating that the user's facial expression falls outside the normal range, the evaluation determination part 351 determines that the virtual communication is allowed to switch to the live communication in step S322 of FIG. 27.

In addition, when the image includes the periphery of the user's face, the evaluation determination part 351 evaluates whether an image of the periphery has changed. When evaluating that the image of the periphery has not changed, the evaluation determination part 351 determines that the virtual communication is not allowed to switch to the live communication in step S322 of FIG. 27. Conversely, when evaluating that image of the periphery has changed, the evaluation determination part 351 determines that the virtual communication is allowed to switch to the live communication in step S322 of FIG. 27.

In addition, the evaluation determination part 351 may determine to what extent the virtual communication is allowed to switch to the live communication based on the evaluation result.

In step S337, the evaluation determination part 351 analyzes the movement of the communication device 100 itself with the control of the input unit 161.

In step S338, the evaluation determination part 351 evaluates the movement analysis result of step S337. For example, the evaluation determination part 351 evaluates whether vibration or pressure at a prescribed reference level or higher has been applied to the communication device 100. When evaluating that the vibration or the pressure at the prescribed level or higher has not been applied to the communication device 100, the evaluation determination part 351 determines that the virtual communication is not allowed to switch to the live communication in step S322 of FIG. 27.

Conversely, when evaluating that the vibration or the pressure at the prescribed level or higher has been applied to the communication device 100, the evaluation determination part 351 determines that the virtual communication is allowed to switch to the live communication in step S322 of FIG. 27.

In step S339, the evaluation determination part 351 calculates evaluation values showing the evaluation results obtained in the way described above. The evaluation determination part 351 performs the processing of step S322 of FIG. 27 using the evaluation values. When the processing of step S339 ends, the evaluation processing ends.

(Calling-Response Processing)

Figure 29:
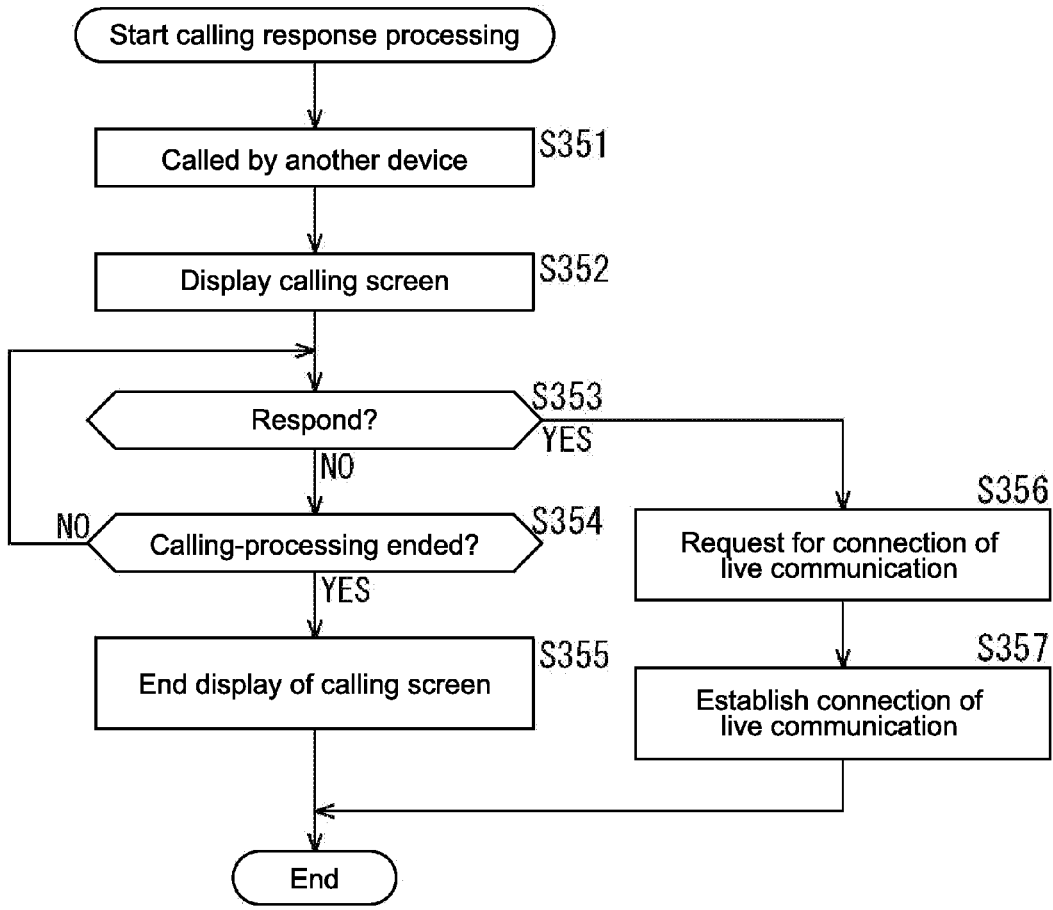
FIG. 29 is a flowchart describing an example of the flow of calling-response processing.

The communication device 100, on which the calling processing has been performed, performs calling-response processing to respond to the calling processing. A description will be given, with reference to the flowchart of FIG. 29, of an example of the flow of the calling-response processing.

In step S351, the calling processing part 352 is called by another communication device via the communication unit 164. In step S352, the calling processing part 352 controls the output unit 162 to have a calling screen displayed on the display 101.

In step S353, the calling processing part 352 determines whether to respond to the calling processing. When the calling processing part 352 determines not to respond to the calling processing, the processing proceeds to step S354.

In step S354, the calling processing part 352 determines whether the calling processing has ended. When the calling processing part 352 determines in step S354 that the calling processing has not ended, the processing returns to step S353. On the other hand, when the calling processing part 352 determines in step S354 that the calling has ended, the processing proceeds to step S355.

In step S355, the calling processing part 352 ends the display of the calling screen. When the processing of step S355 ends, the calling-response processing ends.

On the other hand, when the calling processing part 353 determines in step S353 to respond to the calling processing, the processing proceeds to step S356. In step S356, the calling processing part 352 requests the calling source to connect to the live communication.

In step S357, the connection part 353 establishes the connection of the live communication. When the processing of step S357 ends, the calling-response processing ends.

By performing the respective processing in the way as described above, the communication device 100 is allowed to switch from the virtual communication to the live communication.

Accordingly, the communication device 100 is allowed to improve the convenience of the communication.

(Alert Display)

Figure 30A:
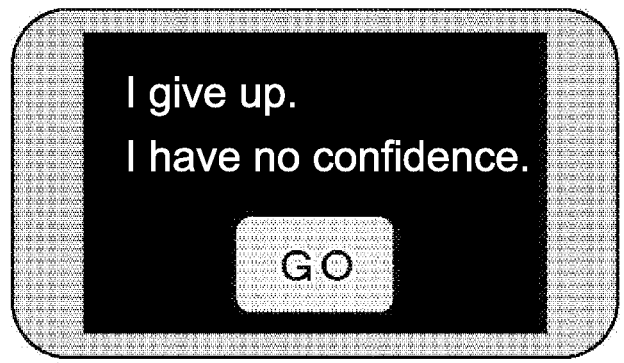
FIGS. 30A and 30B are views describing display examples.

As described above, the calling processing with the alert display is performed when the significance of the switching is high. The alert display may be expressed in any form but is desirably one that expresses emergency. For example, as shown in FIG. 30A, a detected negative keyword may be expressed in a text form.

Figure 30B:
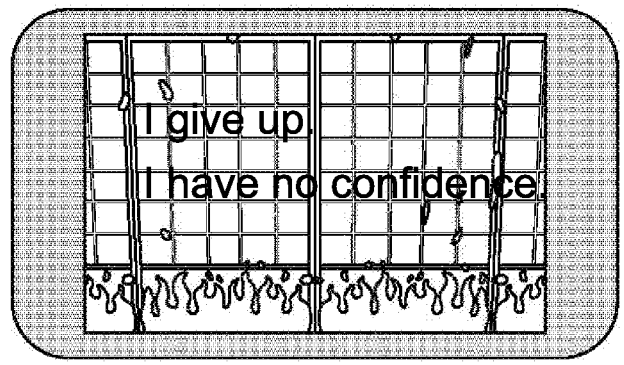

In addition, as shown in the example of FIG. 30B, an image in which the sliding doors shown in FIG. 25B are burned may be displayed.

(Calling Operation)

Note that the user may operate to call a real communication party during the virtual communication.

Figure 31:
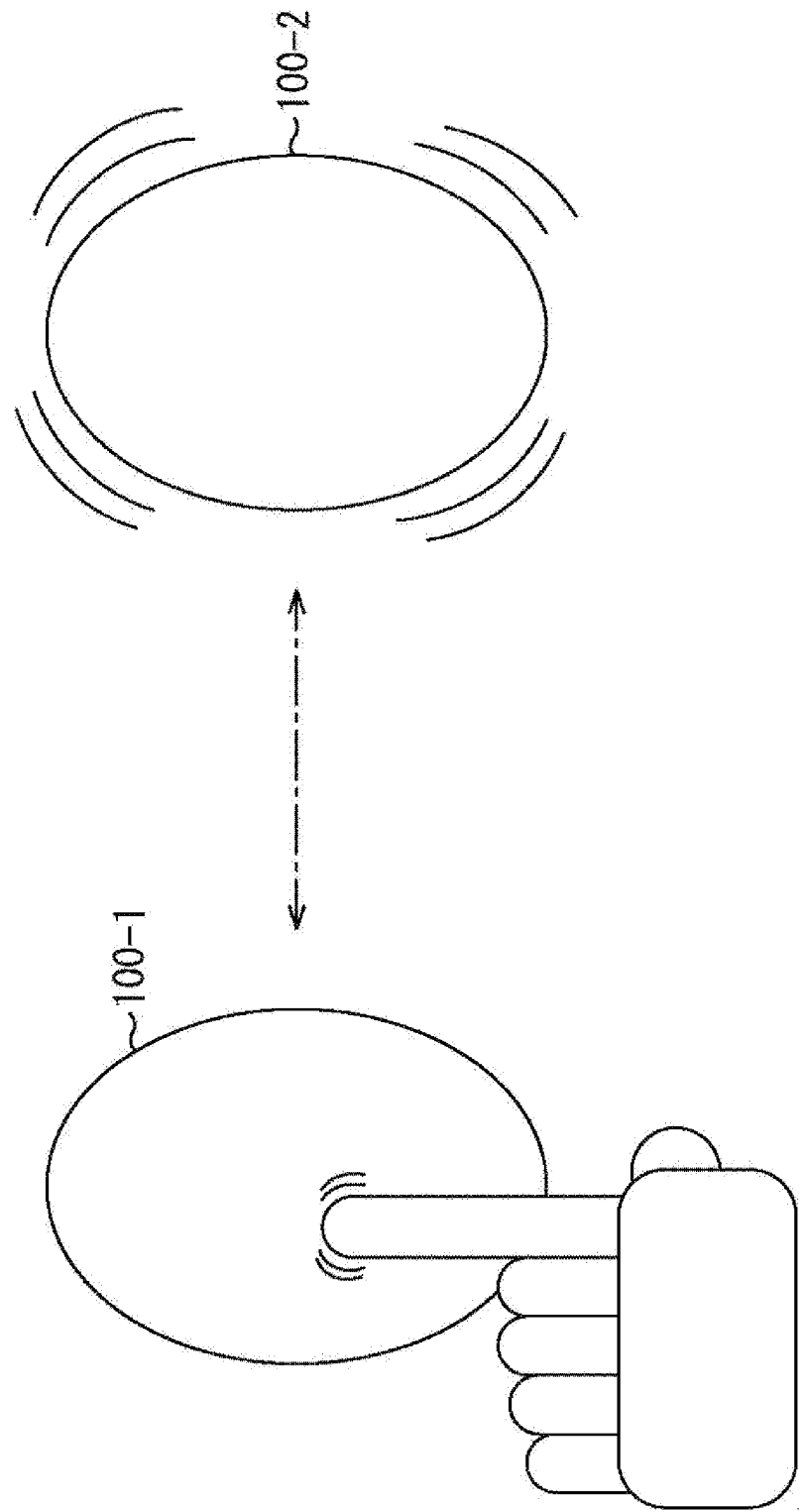
FIG. 31 is a view describing an example of communication.

For example, when the user of the communication device 100-1 taps the touch panel of the communication device 100-1 during the virtual communication (as shown on the left side of FIG. 31), the tapping operation may be transmitted to the communication device 100-2 of a real communication party corresponding to a virtual communication party on the virtual communication to cause the communication device 100-2 to notify the real communication party (the user of the communication device 100-2) of the operation through its vibration.

By realizing the calling processing with such further direct operation as described above, the communication device 100 is allowed to improve the convenience of the communication.

(Switch Processing)

Figure 32:
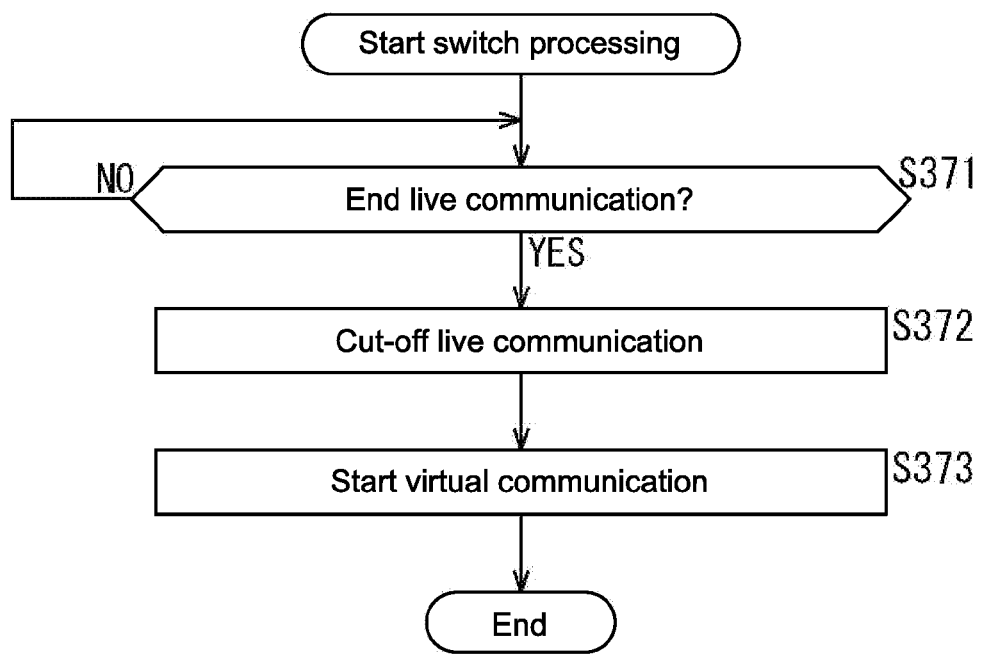
FIG. 32 is a flowchart describing an example of the flow of switch processing.

The communication device 100 is allowed to perform switch processing to switch from the live communication to the virtual communication. A description will be given, with reference to the flowchart of FIG. 32, of an example of the flow of the switch processing in this case.

In step S371, during the live communication, the live communication part 354 determines whether to end the live communication based on a user's input or the like accepted with the control of the input unit 161 and is on standby until determining the end of the live communication.

When the live communication part 354 determines in step S371 to end the live communication, the processing proceeds to step S372.

In step S372, the cut-off part 356 cuts off the live communication. In step S373, the virtual communication part 257 starts the virtual communication with a virtual communication party.

When the processing of step S373 ends, the switch processing ends.

By performing the switch processing as described above, the communication device 100 is allowed to switch from the live communication to the virtual communication and improve the convenience of the communication.

(Computer)

The series of processing described above may be performed not only by hardware but by software. When the series of processing is performed by the software, a program constituting the software is installed in a computer. Here, examples of the computer include computers incorporated in dedicated hardware and general-purpose personal computers capable of performing various functions with the installation of various programs.

Note that besides being chronologically processed in the order described in the specification, the program performed by the computer may be processed in parallel or at appropriate timing such as when being invoked.

In addition, in the specification, steps describing a program recorded on a recording medium include not only processing chronologically performed in the described order but processing performed in parallel or separately besides being not necessarily chronologically performed.

Moreover, in the specification, a system represents the aggregation of a plurality of constituents (devices, modules (components), or the like), and all the constituents may not be included in the same housing. Accordingly, both a plurality of devices accommodated in separate housings and connected to each other via a network and one device in which a plurality of modules are accommodated in one housing are systems.

Further, in the configuration described above, one device (or processing unit) may be divided into a plurality of devices (processing units). Conversely, in the configuration described above, a plurality of devices (or processing units) may be collected into one device (processing unit). Furthermore, each device (or processing unit) may have any configuration other than the configuration described above.

Furthermore, a part of the configuration of one device (or processing unit) may be included in the configuration of another device (or processing unit) so long as an entire system has substantially the same configuration and operation.

The desired embodiments of the present disclosure are described in detail above with reference to the accompanying drawings, but the technical scope of the present disclosure is not limited to the examples. It is clear that any person having ordinary knowledge in the technical field of the present disclosure may conceive various modified or corrected examples within the technical ideas described in the claims and is understood that these modified or corrected examples belong to the technical scope of the present disclosure as a matter of course.

For example, the present technology may have the configuration of cloud computing in which one function is shared between a plurality of devices via a network to be processed in a cooperative way.

In addition, the respective steps in the flowcharts described above may be performed by one apparatus or may be performed by a plurality of apparatuses in a cooperative way.

Moreover, when one step includes a plurality of processing, the plurality of processing included in the one step may be performed by one device or may be performed by a plurality of devices in a cooperative way.

Note that the present disclosure may also employ the following configurations.

(1) A communication device, including:
a first communication part configured to
generate a response by a virtual communication party to a user's input accepted by an input unit and
output the generated response from an output unit as one of an image and a voice to realize first communication between a user and the virtual communication party;
a calling processing part configured to
control a communication unit to communicate with another device and
perform calling processing on a communication device of a real communication party associated with the virtual communication party to call the real communication party when the first communication is realized by the first communication part; and
a second communication part configured to
control the communication unit to supply the user's input accepted by the input unit to the communication device of the real communication party having responded to the calling processing of the calling processing part,
acquire a response to the user's input from the communication device of the real communication party, and
output the acquired response to the output unit to realize second communication between the user and the real communication party.

(2) The communication device according to (1), in which the calling processing part is configured to start the calling processing with a start of the first communication.

(3) The communication device according to (1) or (2), further including:
an evaluation determination part configured to evaluate a content of the first communication and determine whether to perform the calling processing, in which
the calling processing part is configured to start the calling processing when the evaluation determination part determines that the calling processing is performed.

(4) The communication device according to any one of (1) to (3), in which
the evaluation determination part is configured to analyze and evaluate a tone of a user's voice accepted by the input unit.

(5) The communication device according to any one of (1) to (4), in which
the evaluation determination part is configured to
evaluate whether the tone of the voice falls within a range of a tone of a voice of a general conversation and
determine that the calling processing is performed when the tone of the voice falls outside the range.

(6) The communication device according to any one of (1) to (5), in which
the evaluation determination part is configured to analyze and evaluate a keyword of a user's voice accepted by the input unit.

(7) The communication device according to any one of (1) to (6), in which
the evaluation determination part is configured to
evaluate whether the user's voice includes a prescribed negative keyword and
determine that the calling processing is performed when the user's voice includes the prescribed negative keyword.

(8) The communication device according to any one of (1) to (7), in which
the evaluation determination part is configured to analyze and evaluate an image accepted by the input unit.

(9) The communication device according to any one of (1) to (8), in which
the evaluation determination part is configured to
evaluate whether a user's facial expression falls within a normal range when the image includes a user's face and
determine that the calling processing is performed when the user's facial expression falls outside the range.

(10) The communication device according to any one of (1) to (9), in which
the evaluation determination part is configured to
evaluate, when the image includes a periphery of a user's face, whether an image of the periphery changes and
determine that the calling processing is performed when the image of the periphery of the user's face changes.

(11) The communication device according to any one of (1) to (10), in which
the evaluation determination part is configured to analyze and evaluate movement of the communication device itself, the movement being accepted by the input unit.

(12) The communication device according to any one of (1) to (11), in which
the evaluation determination part is configured to
evaluate whether one of vibration and pressure at a prescribed reference level or higher is applied to the communication device and
determine that the calling processing is performed when one of the vibration and the pressure at the reference level or higher is applied.

(13) The communication device according to any one of (1) to (12), in which
the first communication part is configured to start the first communication with an end of the second communication.

(14) The communication device according to any one of (1) to (13), further including:
a first information supply part configured to control the communication unit to supply first information to the communication device of the real communication party associated with the virtual communication party, the first information showing a content of the first communication realized by the first communication part.

(15) The communication device according to any one of (1) to (14), in which
the first information includes one of a log of the first communication and a summary of the log.

(16) The communication device according to any one of (1) to (15), in which
the first information includes one of a color, a density, a pattern, a graphic, a text, and a symbol, each of which shows a content of the first communication.

(17) The communication device according to any one of (1) to (16), further including:
a storage part configured to store setting information of the virtual communication party therein, in which
the first communication part is configured to generate, using the setting information stored in the storage part, the response by the virtual communication part to the user's input accepted by the input unit to realize the first communication.

(18) The communication device according to any one of (1) to (17), further including:
a setting information acquisition part configured to acquire the setting information from another device, in which the storage part is configured to store the setting information acquired by the setting information acquisition part therein.
(19) A communication method, including:
generating a response by a virtual communication party to an accepted user's input and outputting the generated response to realize first communication between a user and the virtual communication party;
performing calling processing on a communication device of a real communication party associated with the virtual communication party to call the real communication party when the first communication is realized; and
supplying the accepted user's input to the communication device of the real communication party having responded to the calling processing, acquiring a response to the user's input from the communication device of the real communication party, and outputting the acquired response to realize second communication between the user and the real communication party.
(20) A program causing a computer to function as:
a first communication part configured to
generate a response by a virtual communication party to a user's input accepted by an input unit and
output the generated response from an output unit as one of an image and a voice to realize first communication between a user and the virtual communication party;
a calling processing part configured to
control a communication unit to communicate with another device and
perform calling processing on a communication device of a real communication party associated with the virtual communication party to call the real communication party when the first communication is realized by the first communication part; and
a second communication part configured to
control the communication unit to supply the user's input accepted by the input unit to the communication device of the real communication party having responded to the calling processing of the calling processing part,
acquire a response to the user's input from the communication device of the real communication party, and
output the acquired response to the output unit to realize second communication between the user and the real communication party.

What is claimed is:
1. A communication device, comprising:
a first communication part configured to:
generate a response by a virtual communication party to a first user's input accepted by an input unit of the communication device, and
output the generated response from an output unit of the communication device as one of an image and a voice to start first communication between the first user of the communication device and the virtual communication party in a state in which the communication device is not connected with any other communication device;
a calling processing part configured to:
control a communication unit to communicate with another device, and
perform calling processing on a communication device of a second user associated with the virtual communication party to call the second user when the first communication is started by the first communication part; and
a second communication part configured to:
control the communication unit to supply the first user's input accepted by the input unit to the communication device of the second user having responded to the calling processing of the calling processing part,
acquire a response to the first user's input from the communication device of the second user, and
output the acquired response to the output unit to start second communication between the first user of the communication device and the second user.
2. The communication device according to claim 1, wherein the calling processing part is further configured to start the calling processing with a start of the first communication.
3. The communication device according to claim 1, further comprising:
an evaluation determination part configured to evaluate a content of the first communication and determine whether to perform the calling processing,
wherein the calling processing part is further configured to start the calling processing when the evaluation determination part determines that the calling processing is performed.
4. The communication device according to claim 3, wherein the evaluation determination part is further configured to analyze and evaluate a tone of a first user's voice accepted by the input unit.
5. The communication device according to claim 4, wherein the evaluation determination part is further configured to:
evaluate whether the tone of the voice falls within a range of a tone of a voice of a general conversation, and
determine that the calling processing is performed when the tone of the voice falls outside the range.
6. The communication device according to claim 3, wherein the evaluation determination part is further configured to analyze and evaluate a keyword of the first user's voice accepted by the input unit.
7. The communication device according to claim 6, wherein the evaluation determination part is further configured to:
evaluate whether the first user's voice includes a prescribed negative keyword, and
determine that the calling processing is performed when the first user's voice includes the prescribed negative keyword.
8. The communication device according to claim 3, wherein the evaluation determination part is further configured to analyze and evaluate an image accepted by the input unit.
9. The communication device according to claim 8, wherein the evaluation determination part is further configured to:
evaluate whether the first user's facial expression falls within a normal range when the image includes the first user's face, and
determine that the calling processing is performed when the first user's facial expression falls outside the range.

10. The communication device according to claim 8, wherein the evaluation determination part is further configured to:
  evaluate when the image includes a periphery of the first user's face, whether the image of the periphery changes, and
  determine that the calling processing is performed when the image of the periphery of the first user's face changes.

11. The communication device according to claim 3, wherein the evaluation determination part is further configured to analyze and evaluate movement of the communication device itself, the movement being accepted by the input unit.

12. The communication device according to claim 11, wherein the evaluation determination part is further configured to:
  evaluate whether one of vibration and pressure at a prescribed reference level or higher is applied to the communication device, and
  determine that the calling processing is performed when one of the vibration and the pressure at the reference level or higher is applied.

13. The communication device according to claim 1, wherein the first communication part is further configured to start the first communication with the end of the second communication.

14. The communication device according to claim 1, further comprising:
  a first information supply part configured to control the communication unit to supply first information to the communication device of the second user associated with the virtual communication party, wherein the first information showing a content of the first communication started by the first communication part.

15. The communication device according to claim 14, wherein the first information further includes one of a log of the first communication and a summary of the log.

16. The communication device according to claim 14, wherein the first information further includes one of a color, a density, a pattern, a graphic, a text, and a symbol, each of which shows a content of the first communication.

17. The communication device according to claim 1, further comprising:
  a storage part configured to store setting information of the virtual communication party therein, wherein
  the first communication part is further configured to generate, using the setting information stored in the storage part, the response by the virtual communication part to the first user's input accepted by the input unit to start the first communication.

18. The communication device according to claim 17, further comprising:
  a setting information acquisition part configured to acquire the setting information from another device, wherein
  the storage part is further configured to store the setting information acquired by the setting information acquisition part therein.

19. A communication method, comprising:
  generating a response by a virtual communication party to an accepted first user's input and outputting the generated response to start first communication between the first user of the communication device and the virtual communication party in a state in which the communication device is not connected with any other communication device;
  performing calling processing on a communication device of a second user associated with the virtual communication party to call the second user when the first communication is started; and
  supplying the accepted first user's input to the communication device of the second user having responded to the calling processing;
  acquiring a response to the first user's input from the communication device of the second user; and
  outputting the acquired response to start second communication between the first user of the communication device and the second user.

20. A non-transitory computer-readable recording medium having a set of computer-executable instructions recorded thereon, the instructions causing a computer to function as:
  a first communication part configured to:
    generate a response by a virtual communication party to a first user's input accepted by an input unit, and
    output the generated response from an output unit as one of an image and a voice to start first communication between a first user of the communication device and the virtual communication party in a state in which the communication device is not connected with any other communication device;
  a calling processing part configured to:
    control a communication unit to communicate with another device, and
    perform calling processing on a communication device of a second user associated with the virtual communication party to call the second user when the first communication is started by the first communication part; and
  a second communication part configured to:
    control the communication unit to supply the first user's input accepted by the input unit of the communication device to the communication device of the second user having responded to the calling processing of the calling processing part,
    acquire a response to the first user's input from the communication device of the second user, and
    output the acquired response to the output unit to start second communication between the first user of the communication device and the second user.

* * * * *